United States Patent
Lazzi et al.

(10) Patent No.: US 12,517,621 B2
(45) Date of Patent: *Jan. 6, 2026

(54) FLUIDIC WIRE SENSORS

(71) Applicant: Teveri LLC, Pasadena, CA (US)

(72) Inventors: Gianluca Lazzi, Pasadena, CA (US); Dulce Maria Altabella Lazzi, Pasadena, CA (US); Kyle Loizos, Salt Lake City, UT (US); Arup Roy, Los Angeles, CA (US); Proyag Datta, Thousand Oaks, CA (US)

(73) Assignee: Teveri LLC, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,958

(22) Filed: Nov. 20, 2023

(65) Prior Publication Data
US 2024/0160330 A1 May 16, 2024

Related U.S. Application Data

(63) Continuation-in-part of application No. 17/960,638, filed on Oct. 5, 2022, now abandoned, which is a
(Continued)

(51) Int. Cl.
*G06F 3/045* (2006.01)
*A61B 5/00* (2006.01)
(Continued)

(52) U.S. Cl.
CPC ............ *G06F 3/047* (2013.01); *A61B 5/6804* (2013.01); *A61B 5/6805* (2013.01); *G06F 1/16* (2013.01);
(Continued)

(58) Field of Classification Search
CPC . G06F 3/047; G06F 1/16; G06F 1/163; G06F 3/041; G06F 3/0414; A61B 5/6804; A61B 5/6805; H01B 1/02; H03K 19/1733
See application file for complete search history.

(56) References Cited

U.S. PATENT DOCUMENTS

| 2004/0037708 A1 | 2/2004 | Murasato et al. |
| 2012/0118066 A1 | 5/2012 | Majidi et al. |

(Continued)

FOREIGN PATENT DOCUMENTS

| KR | 20030014226 A | 2/2003 |
| WO | 2012050938 A2 | 4/2012 |
| WO | 2018018023 A1 | 1/2018 |

OTHER PUBLICATIONS

PCT International Preliminary Report on Patentability in PCT International Application Serial No. PCT/US2017/056198 dated Apr. 16, 2019 (11 pages).
PCT International Search Report and Written Opinion in PCT International Application Serial No. PCT/US2017/056198 mailed on Feb. 1, 2018 (15 pages).

*Primary Examiner* — Adam R. Giesy
(74) *Attorney, Agent, or Firm* — Alliance IP, LLC

(57) ABSTRACT

A wearable sensor device includes a liquid metal wire that includes an elongated tube with an internal cavity having a uniform cross-sectional geometry, the internal cavity is at least partially filled with liquid metal. The wearable sensor device further includes detection circuitry to detect a change in an electrical attribute of the liquid metal wire based on a temporary change in the cross-sectional geometry, and generate sensor data to identify an event associated with a wearer of the wearable device based on the temporary change in the cross-sectional geometry.

20 Claims, 32 Drawing Sheets

Related U.S. Application Data continuation of application No. 17/491,501, filed on Sep. 30, 2021, now abandoned, which is a continuation of application No. 16/341,041, filed as application No. PCT/US2017/056198 on Oct. 11, 2017, now Pat. No. 11,137,867.

(60) Provisional application No. 63/585,100, filed on Sep. 25, 2023, provisional application No. 62/406,822, filed on Oct. 11, 2016.

(51) Int. Cl.
   *G06F 1/16* (2006.01)
   *G06F 3/041* (2006.01)
   *G06F 3/047* (2006.01)
   *H01B 1/02* (2006.01)
   *H03K 19/173* (2006.01)

(52) U.S. Cl.
   CPC ............. *G06F 1/163* (2013.01); *G06F 3/041* (2013.01); *G06F 3/0414* (2013.01); *H01B 1/02* (2013.01); *H03K 19/1733* (2013.01)

(56) References Cited

U.S. PATENT DOCUMENTS

| | | |
|---|---|---|
| 2012/0222944 A1 | 9/2012 | Kim et al. |
| 2014/0071583 A1 | 3/2014 | Rofougaran |
| 2014/0238153 A1* | 8/2014 | Wood .................. A43B 23/029 73/862.627 |
| 2018/0243924 A1 | 8/2018 | Visell et al. |
| 2021/0145608 A1* | 5/2021 | Herr .................... A61B 8/0825 |

* cited by examiner

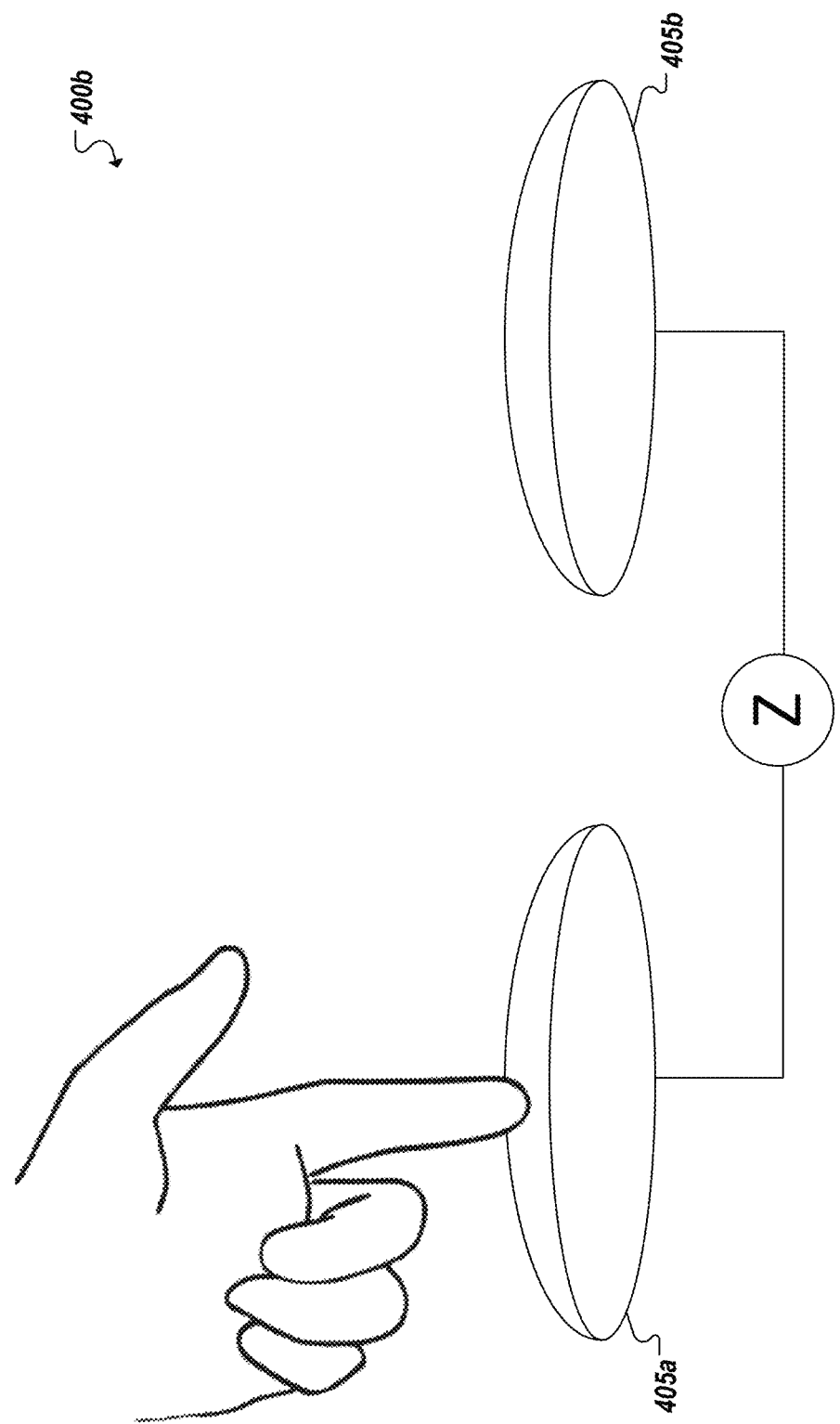

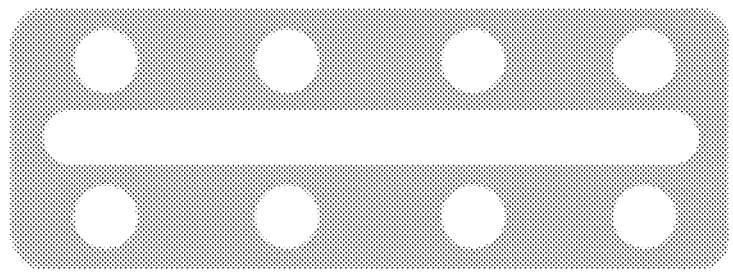
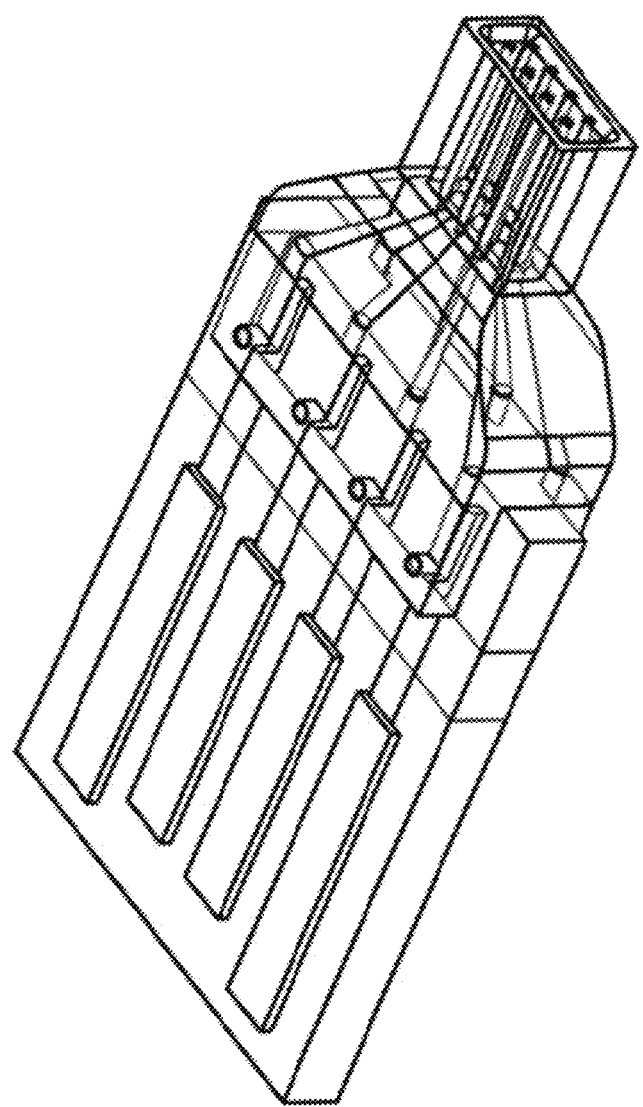
FIG. 20

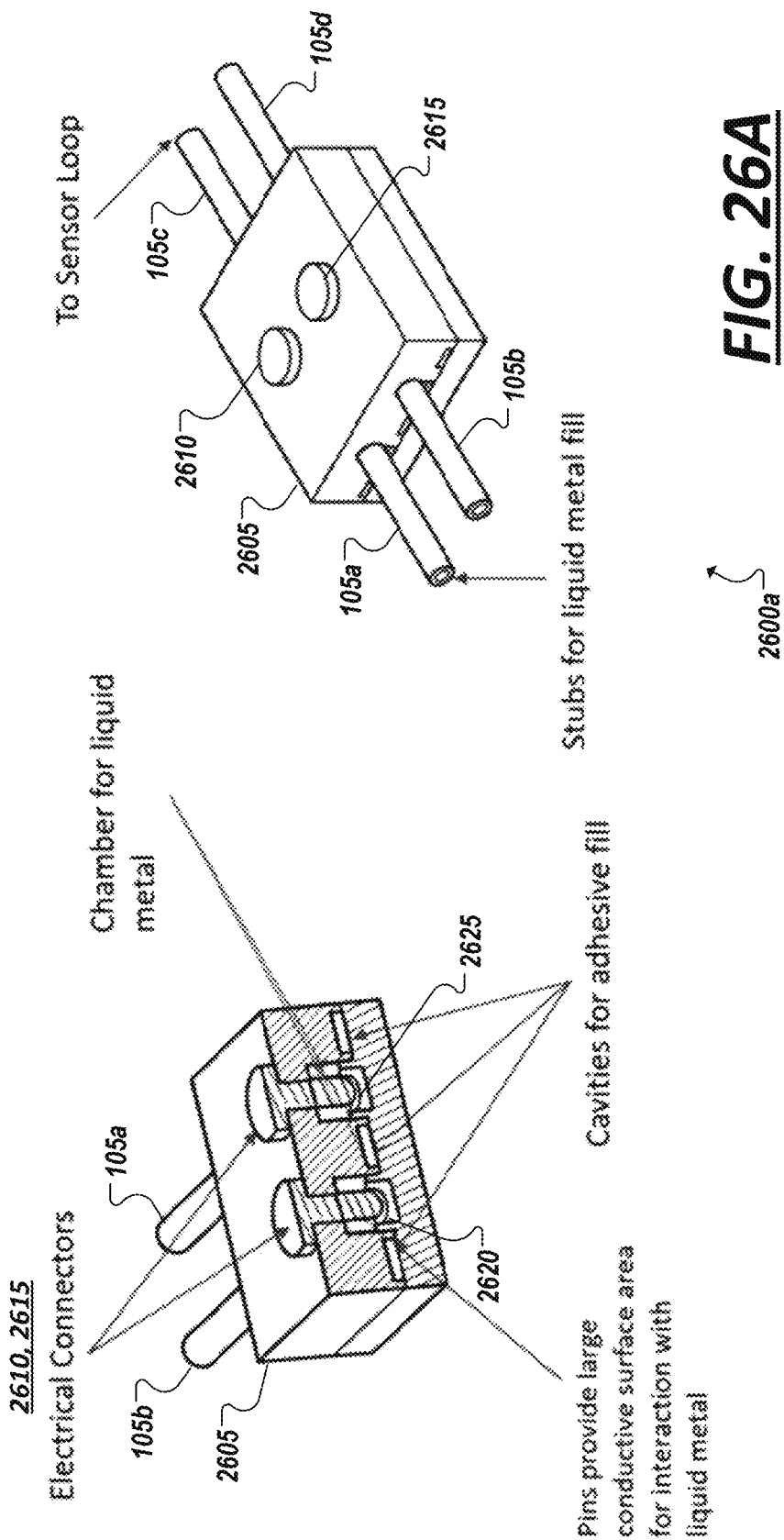

FLUIDIC WIRE SENSORS

CROSS-REFERENCE TO RELATED APPLICATIONS

This application is a continuation-in-part (and claims the benefit of priority under 35 U.S.C. § 120) of U.S. application Ser. No. 17/960,638, filed on Oct. 5, 2022, and entitled FLUIDIC WIRE TOUCH SENSORS which application is a continuation of U.S. application Ser. No. 17/491,501 filed on Sep. 30, 2021, which application is a continuation of Ser. No. 16/341,041, filed Apr. 10, 2019, issued as U.S. Pat. No. 11,137,867 on Oct. 5, 2021, which application is a national stage application under 35 U.S.C. § 371 of PCT International Application Serial No. PCT/US2017/056198, filed on Oct. 11, 2017, which application claims benefit to U.S. Provisional Patent Application Ser. No. 62/406,822, filed on Oct. 11, 2016. This application further claims priority to U.S. Provisional Patent Application Ser. No. 63/585,100 filed on Sep. 25, 2023 and entitled FLUIDIC WIRE SENSORS. The disclosures of the prior applications are considered part of and are hereby incorporated by reference herein in their entirety in the disclosure of this application.

BACKGROUND

The present disclosure relates in general to the field of computer systems, and more specifically, to deformable electronic devices.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive. The trend toward miniaturization of computing hardware, peripherals, as well as of sensors, detectors, and image and audio processors, among other technologies, has helped open up a field sometimes referred to as "wearable computing." A variety of wearable computing devices are being developed allowing electronic components to be carried on human and animal users.

BRIEF DESCRIPTION OF THE DRAWINGS

FIG. 4B illustrates a simplified block diagram of an example touch sensor implemented using a liquid metal-filled bubble.

FIGS. 18-26B are diagrams of example connector elements for use in interfacing with liquid metal wires.

Like reference numbers and designations in the various drawings indicate like elements.

DETAILED DESCRIPTION

Figure 1A:
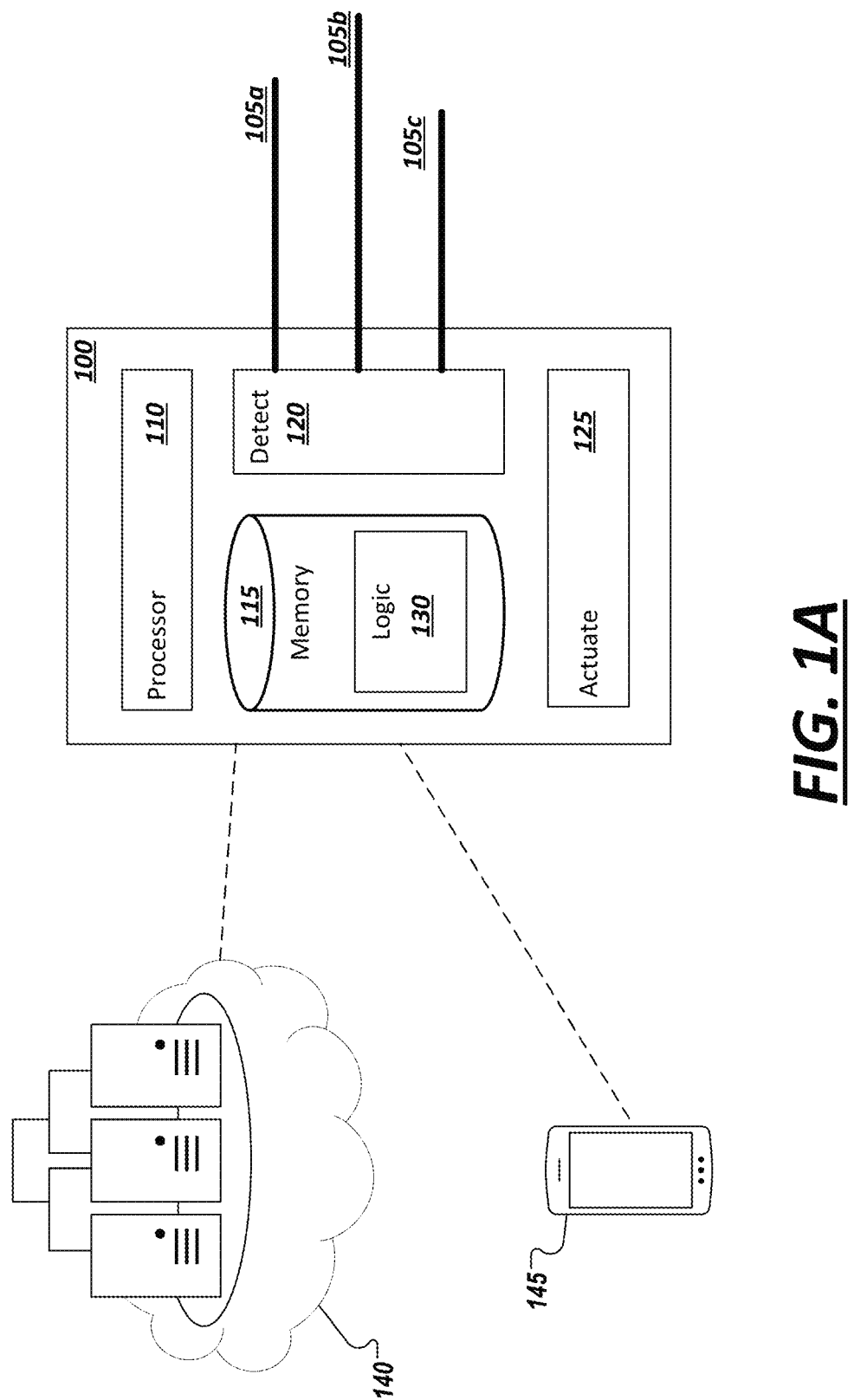
FIG. 1A illustrates a simplified schematic diagram of an example system including one or more touch sensors implemented using one or more liquid metal cavities.

The subject matter described herein provides for touch sensors constructed from reversibly deformable and mechanically tunable fluidic cavities containing liquid metal (also referred to herein as "liquid metal cavities"). Cavities within this context may refer to an elastomeric structure, which may contain form a volume in which liquid metal may be contained. Liquid metal cavities may define and house liquid metal in potential any geometry. In some instances, liquid metal cavities may be formed from elastomeric capillaries (or potentially any cross-sectional geometry) to form a liquid metal wire when filled with liquid metal. In other examples, liquid metal cavities may be embodied as a bubble or blister of potentially any geometry (e.g., rounded, angular, or irregular shaped) to house liquid metal, among other examples.

The reversibly deformable and mechanically tunable fluidic cavities may be formed by injecting a liquid metal, such as gallium or a gallium-based alloy, into one or more sheaths or other cavities within a material substrate or a base material (e.g., coupled to a bonding layer material). Any liquid metal that has a melting point below an ambient liquid metal device manufacturing facility temperature or the temperature of the desired operating environment may be used such that heating of the liquid metal is not required for the liquid metal to be introduced during manufacturing or for the liquid metal to retain its deformable properties in application. An example temperature range from negative twenty degrees Celsius (−20° C.) to forty degrees Celsius (40° C.) may be used in association with certain of the metals described herein that are in a liquid state within this range, though it is understood that other temperature ranges may be appropriate for other implementations of liquid metal to be used to form a reversibly deformable and mechanically tunable fluidic cavity. In one example, eutectic gallium indium (EGaIn) has a melting point of fifteen and seven tenths degrees Celsius (15.7° C.) and given the supercooling property of gallium may maintain this liquid property at temperatures even lower than its melting point, allowing EGaIn (and other gallium-based alloys) to be used as the liquid metal within an example fluidic cavity. For instance, a gallium-based alloy including other metals, such as tin (e.g., Galistan), gold, etc. may be utilized as the liquid metal. As such, a lower end of the ambient liquid metal cavity manufacturing facility temperature range for such an implementation may be considered, for example, sixteen degrees Celsius (16° C.). Other metals and temperature ranges may be used for formation of liquid metal cavities that may have higher or lower melting points, and as such, different ambient liquid metal device manufacturing facility temperature ranges.

In some cases, a fluidic cavity, such as a fluidic wire, may be constructed by injecting the liquid metal into a wire housing or sheath, or other cavity. As an alternative to injecting a liquid metal into one or more cavities, the liquid metal may be drawn into a cavity by applying a vacuum or other pulling force to the liquid metal via the cavity. In either implementation, injecting or drawing the liquid metal into the cavity may be terminated in response to the cavity filling to capacity. Alternatively, filling the cavity may be terminated on demand by cessation of the filling process upon filling of the cavity to an extent sufficient to allow radiation of electromagnetic energy via the fluidic wire. Inlet and outlet filling hole locations may be provided for the respective operations, and the cavity may be sealed in response to filling the cavity.

The term "fluidic wire" and "liquid metal wire" may be used interchangeably to represent a wire with a liquid metal resonant element. The term "material" and "substrate" may be used interchangeably to represent a substance within which a fluidic wire may be formed. The term "cavity" may be used to represent a hollow channel, capillary, conduit, sheath, groove, bubble, furrow or other structure within a substrate within which liquid metal may be filled to form a fluidic cavity. The terms "cavity," "channel," and "capillary" or other terms may be used interchangeably hereafter to identify a void or other structure, within one or more portions of material that define a shape of a fluidic cavity, that may be filled with liquid metal to form a fluidic cavity. For certain implementations, a channel may be considered a "microfluidic channel."

The material within which liquid metal is to be introduced to form a liquid metal may include a flexible and/or stretchable material, for example, an elastomer such as silicone or other polymer-based materials. Other examples of flexible materials include polymer films, composite substrates, gels, thin metal supports, and other flexible materials. The material within which the cavity is formed may also include rigid materials such as wood, dry wall, polymeric parts, polymer films, gels, and other rigid materials. It is understood that the present subject matter applies to any material that may form a cavity that may define a desired shape for the fluidic cavity and all such materials are within the scope of the present subject matter. Some application-specific restrictions may be considered, such as for fluidic wires, where the material may be selected to avoid interfering with spectral properties of the fluidic wire beyond interference acceptable within a given implementation, among other examples.

A cavity may be formed into a substrate in a variety of manners. Because the cavity is formed with a liquid metal, the mechanical properties of the cavity may be defined by mechanical properties of the substrate. As such, for an elastomeric substrate, the resulting elastomeric fluidic cavity may be deformed (e.g., stretched, bent, flexed, rolled, etc.) and released/reversed without loss of electrical continuity. As a consequence, the resulting cavities, such as liquid metal wires, may be more durable relative to conventional technologies and may be utilized in applications that would otherwise result in destruction of conventional sensors. Strain may be induced in a material, for example, in response to temperature changes, pressure changes, mechanical load changes, geographical changes, or any other change that results in a force on the material that deforms, elongates, shrinks, or otherwise changes the material's dimensions. For example, the fluid metal may flow in response to strain (e.g., elongation) of the elastomeric substrate, resulting in a reconfiguration of the geometry of the fluidic wire and a resulting shift in the resonant frequency of the wire, while returning to its original geometry and frequency response upon removal of the applied strain. Based upon these properties, the fluidic wire is considered to have no or minimal hysteresis, as defined by the mechanical properties of the substrate in response to mechanical strain and release of mechanical strain.

In one implementation, a fluidic cavity may be utilized to implement a touch sensor. For instance, as shown in the simplified block diagram of FIG. 1A, a touch sensor may be implemented using one or more fluidic cavities (e.g., 105a-c). A sensor block 100 may be provided that includes one or more data processing apparatus (e.g., 110), computer readable storage devices (e.g., 115), and one or more other elements (e.g., 120, 125) implemented at least in part in hardware circuitry (and potentially also more advanced software- or firmware-based logic 130) to implement functionality associated with a fluidic-wire-based sensor. The sensor block 100 may generate data as outputs and communicate this data to other computing devices and systems (e.g., 140, 145), which may be capable of consuming the data to generate additional results (e.g., more advanced processing and analysis of the data, graphical results or other outputs for consumption by users, anonymized data aggregation, etc.). For instance, sensor data generated by the sensor block 100 may be sent to a cooperating user computing device 145 (e.g., a smartphone for consumption by an app executed on the smartphone) or may be sent for processing by a cloud-based or other distributed computing system (e.g., 140) via a network, among other examples. Fluidic-wire-based sensors may be implemented in a variety of applications, which may advantageously make use of the flexible and stretchable fluidic cavities used to implement the touch sensor(s). For instance, the fluidic wires 105a-c may be woven into an article such as a garment, wallpaper, the outer covering a ball, upholstery, art canvas, or other article with other fibers or material to embed touch sensors within the article.

Figure 2A:
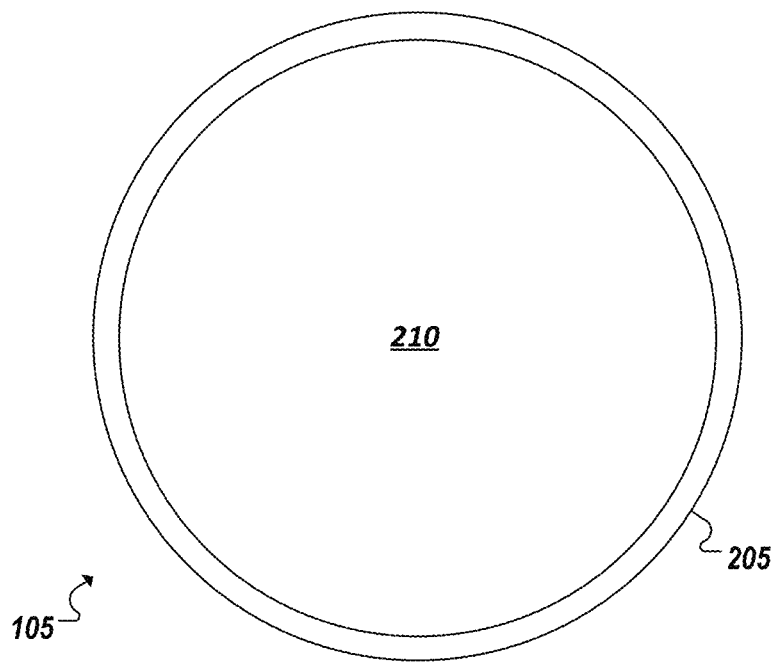
FIGS. 2A-2B are block diagrams illustrating cross-sectional views of an example deformable liquid metal wire.
Figure 2B:
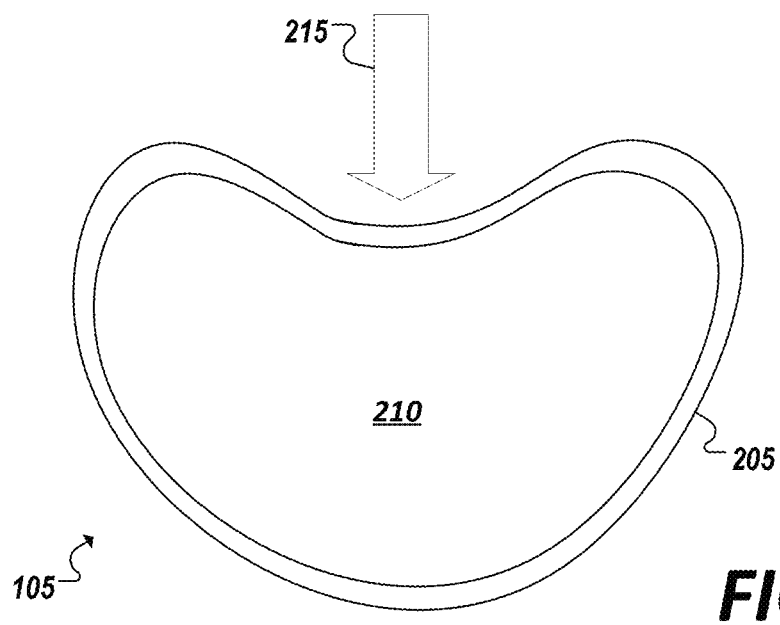

As shown in the example illustrations of FIGS. 2A-2B, the deformable and compressible nature of a fluidic wire may allow for it to be depressed. For instance, FIG. 2A represents a cross-section of an example fluidic wire 105 including a capillary cover 205 encapsulating liquid metal 210. In FIG. 2A, the fluidic wire 105 is in its default state, with the liquid metal 210 filling this section of the cover 205 and forming a substantially round cross-section. In other implementations, a non-round cross-section may be realized, for instance using a casing, sheath, or capillary cover with a rectangular, hexagonal, or other cross-section. FIG. 2B shows the fluidic wire's 105 cross-section when it is depressed by a force exerted (e.g., at 215) on the cover 205. The deformable nature of the fluidic wire allows the cross-section to be temporarily altered in connection with the force 215. In some cases, this depression of the fluidic wire causes some of the liquid metal 210 to be displaced within the cavity, which may temporarily alter the electromagnetic characteristics of the fluidic wire. Once the force 215 ceases to be applied, the reversible deformability (e.g., elasticity) of the fluidic wire (e.g., as provided by the material of the covering 205) may cause the 105 wire to return to its default cross-section (e.g., as shown in FIG. 2A), as well as its default electrical characteristics. It should be appreciated that a metal need not be purely liquid in order to function as the metal within the fluidic wire, only that the metal be compressible within the capillary and advantageously able to at least partial return to its original form. Indeed, any one of a variety of metals may be used as the liquid metal (e.g., 210) within a fluidic wire, including liquid gold, gallium-based alloys, heterogeneous metal solutions, among several other examples.

The force applied to a fluidic wire to depress and change its default cross-sectional geometry may take a variety of forms. For instance, while some of the examples herein describe a discrete, localized force being applied to a particular point along the length of the fluidic wire, a more distributed force applied along a longer length of the overall fluidic wire, or stretching of the fluidic wire casing may cause similar changes (albeit more widespread along the length of the wire) to the cross-sectional geometry of the wire. Indeed, changes in the electrical attributes of the fluidic wire may differ depending on the type and amount of force applied to a fluidic wire, whether along the entire length of the wire (e.g., through a force elongating the wire) or only a portion of the wire, among other examples.

Returning to the example of FIG. 1A, an example sensor block 100 may provide logic (e.g., 120, 125, 130, etc.) to interpret and drive actions based on force applied to, or "touch interactions", with fluidic cavities 105-c. For instance, a force may be applied to depress one or more of the fluidic cavities 105a-c and touch detection circuitry or other logic 120 may detect that the depression is to be interpreted as a touch interaction. Such touch interactions may be the result of a human hand or finger depressing one or more of the cavities 105a-c, may be the result of an impact with another physical body causing one or more of the cavities 105a-c to be compressed, among other examples. In some instances, touch events or interactions may be defined to meet certain characteristics, such as the duration of the depression of one or more of the cavities 105a-c, intensity of the depression (e.g., representing the degree to which the cavity was compressed), a specific combination of two or more cavities being depressed concurrently or in succession, a pattern of touches, among other examples. The compression or depression of any individual cavity (e.g., 105a-c) may be detected, in some examples, by circuitry or logic in detection logic 120 that detects a change in the electrical characteristics of the cavity (or multiple cavities). For instance, a change in impedance of the cavity be detected and may be due to the temporary deformation of the cavity resulting from a touch instance. In some implementations, machine learning may be utilized to define (and potentially also adjust the logic (e.g., 120, 125) used in connection with fluidic-cavity-based touch sensors) parameters for identifying when characteristics measured at the sensor should be interpreted as a touch or even a particular type of touch (of potentially many different touch types), among other example implementations.

A touch sensor may include additional logic to not only interpret various touch events, but to cause other actions in response to a corresponding touch event. For instance, logic 130 may be provided to realize any one of a variety of services. For instance, touch events may be stored and processed by logic 130 to provide biofeedback (e.g., in an athletic garment incorporating the touch sensor), register an event (e.g., a ball incorporating the touch sensor striking a surface, a user sitting on a seat that incorporates the touch sensor, etc.), or drive other software and/or hardware components (e.g., through actuator logic 125) to generate data describing the detected events (e.g., for storage in memory 115), cause other actions and provide services that use touch sensor events as inputs, among other examples.

Figure 1B:
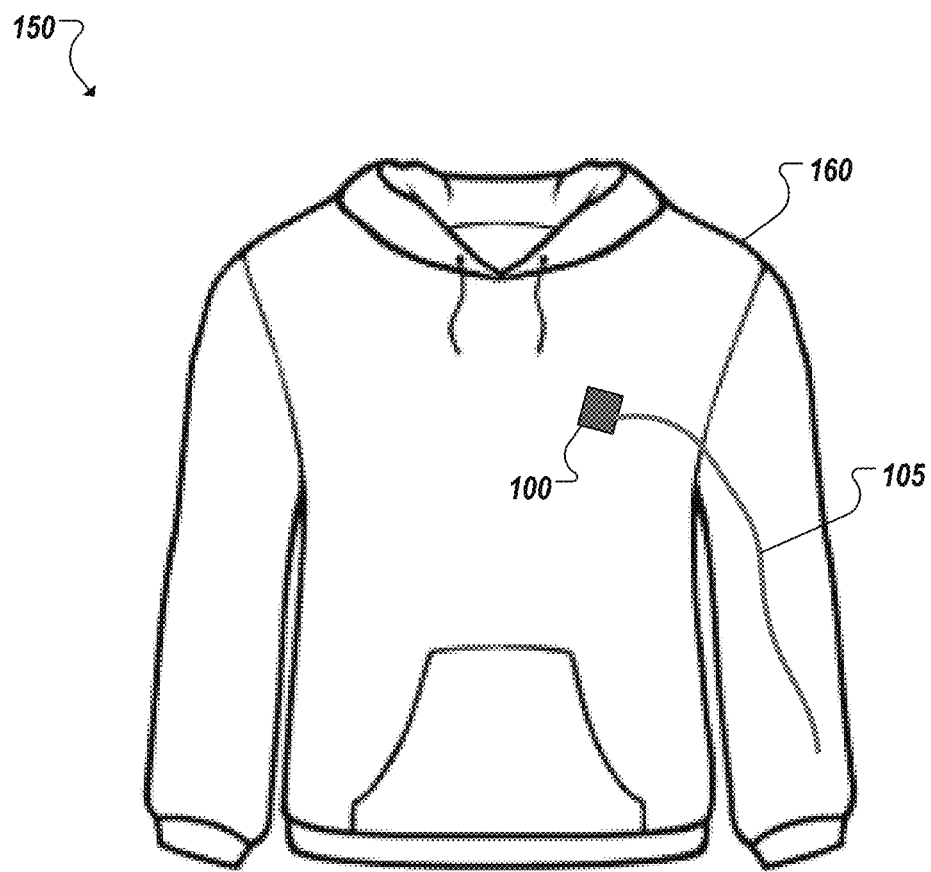
FIG. 1B illustrates a simplified diagram of an example wearable device including a liquid metal touch sensor.

The elastic and flexible nature of fluidic cavities may allow the fluidic cavities to be integrated into a variety of applications where solid metal wires or conventional sensors may be suboptimal. For instance, some devices may be integrated in, come in regular contact with, or be carried or worn in such a way that the device (and the wires interconnecting the components of the device) is regularly compressed, folded, bent, twisted, bounced, etc. As but one example of such an article, wearable devices may be provided, which are to be worn or carried by a human, animal, robot, etc. Such wearable devices may utilize fluidic wires to carry power and/or signals within the device (and even out from the device to peripheral devices or components which may be attached to the wearable device). For instance, as shown in the simplified illustration 150 of FIG. 1B, a simplified diagram 150 is shown to illustrate an example wearable garment 160 to which one or more electronic components (e.g., 100) have been attached (e.g., adhered, interwoven, sewn, clipped, or otherwise attached). For instance, in this example, a fluidic wire 105 may be utilized to connect to a controller component 100 and form a touch sensor. A user, in this example, may depress the sleeve of the garment 160 to cause one or more fluidic wires (e.g., 105) to be depressed and cause a touch event to be registered at the controller component 100, which may cause the controller to generate data and/or actuate other components or actions provided for on the garment. In some examples, the fluidic wire may be integrated, adhered, interwoven, or otherwise connected to the fabric of the garment 160 itself. A variety of other articles may be composed of components utilizing fluidic wires other than touch sensors, such as a fluidic wire used as an antenna, as connective links to other components, among other examples, including combinations of the foregoing.

Figure 3:
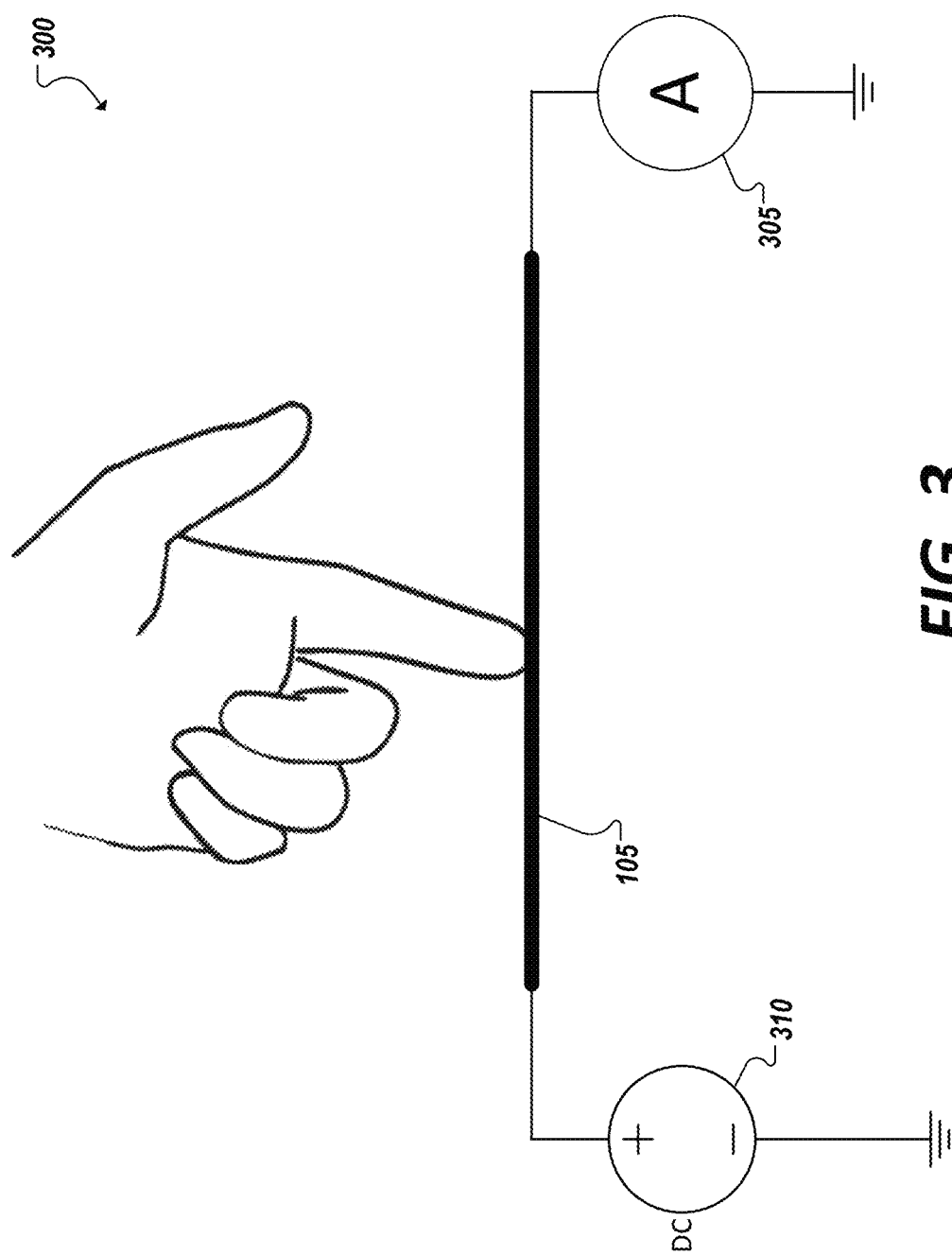
FIG. 3 illustrates a simplified block diagram of an example touch sensor implemented using a liquid metal wire.

In one example, as represented in FIG. 3, a touch sensor device implemented using fluidic wire 105 may incorporate an impedance measurement (e.g., 305) into stretchable liquid metal wires for use as a switch or input for devices implementing the touch sensor (e.g., controlling volume or phone operations from headphone wires that use liquid metal wires, with the control being embedded in the wire itself through the touch sensor). Due to the liquid metal wires being conductive, with the liquid metal placed either in adjacent lumens within the same wire or multiple wires attached to form a single wire, it has an inherent electrical impedance. Since liquid metal is not solid, as in other electrical wires on the market, the wire can be stretched, pressed, etc. By applying physical pressure anywhere along the wire, the shape of the lumen or cavity that contains the liquid metal changes and/or the distance from one cavity to another changes.

This change can be measured as a change in impedance from one side of the wire, and can be measured as a change in capacitance, resistance, and/or inductance. This measurement can be accomplished through voltage or current meters, following any method for measuring impedance of an electrical circuit. For example, to measure a change in resistance, an electrical current can be applied (e.g., using source 310) to a wire 105, and an increase in resistance due to physical pressure can be measured (at 305) as a change in voltage across the wire.

Figure 4A:
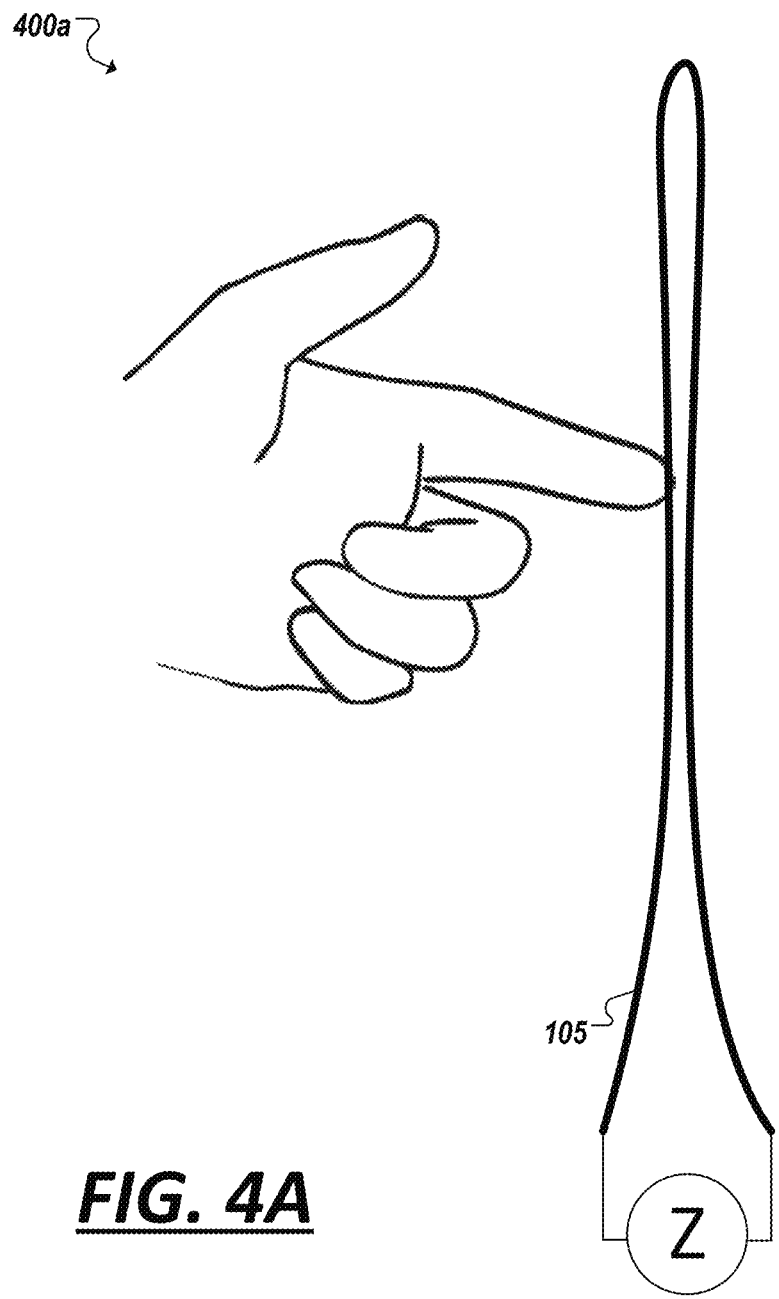
FIG. 4A illustrates a simplified block diagram of an example touch sensor implemented using a liquid metal wire.

Another example, represented in simplified block diagram 400a of FIG. 4A, may provide for touch events to be measured (at least in part) through measuring a change in capacitance, based on a touch event. For instance, two wires or even a single wire 105 (as shown in FIG. 4A) may be positioned within an article to form two substantially adjacent wire segments. Any electrical characteristics (e.g., resistance, capacitance, inductance) contributing to the impedance Z measure on or between two liquid metal cavities may be measured. For instance, capacitance of the wire(s) may be measured, for instance, by applying a pulsing voltage waveform to the wire or lumen within the wire, and computing the capacitance between it and the adjacent wire segment (e.g., by measuring the time constant). In addition, using the example of FIG. 4A as an example, the termination of the wire on the side not being directly measured may potentially have any impedance load, allowing for zero impedance and treating adjacent liquid metal fibers as parallel-plate capacitors, infinite impedance and treating the liquid metal fibers as a single fiber that varies resistance and inductance when pressed or oriented differently, or a more complex load in between, among other examples. As shown in the simplified block diagram 400b of FIG. 4B, non-wire implementations of a liquid metal cavity (e.g., 405a-b) may be utilized in some embodiments, and inductance (or simply capacitance, resistance, or inductance) may be measured between the cavities 405a-b to detect a touch event occurring at one of the cavities (e.g., 405a). As shown in the example of FIG. 4B, two bubble or blister liquid metal cavities 405a-b may be attached to a substrate and circuitry may be provided to provide a voltage to each cavity. Further, circuitry may be provided to measure electrical characteristics of the circuit to detect a change to the electrical characteristics attributable to a touch event. For instance, touching bubble 405a may cause the bubble to be depressed, temporarily changing the dimensions of the bubble 405a and affecting the capacitance (and thereby the impedance) measured between the two bubbles 405a-b (resulting in a different measurement than would be observed if neither bubble 405a-b were depressed. In still other examples, heterogeneous cavity types may be paired in some touch sensor implementations, such as using a liquid metal wire and a liquid metal blister and measuring impedance, capacitance, and other electrical characteristics between the two liquid metal cavities, among other examples.

Figure 5A:
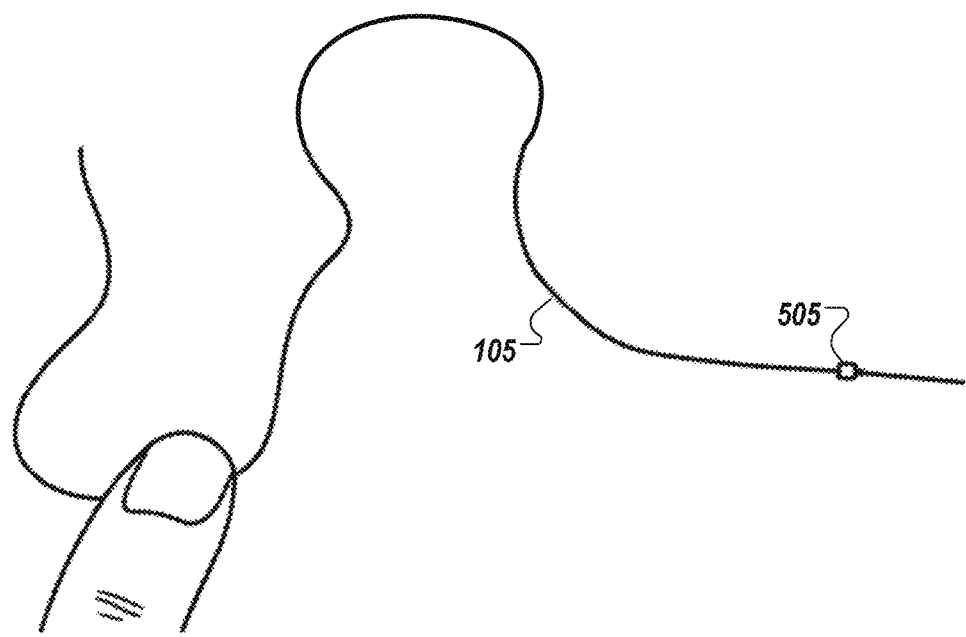
FIGS. 5A-5B are photographs of a first example touch sensor implemented using one or more liquid metal wires.
Figure 5B:
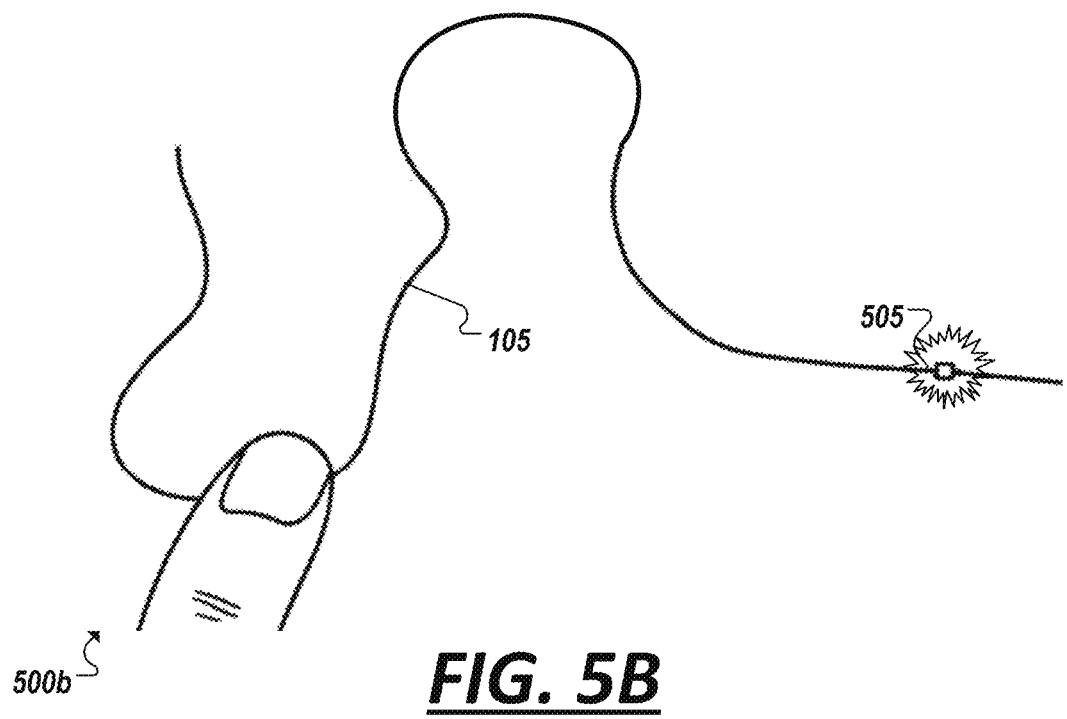
Figure 5C:
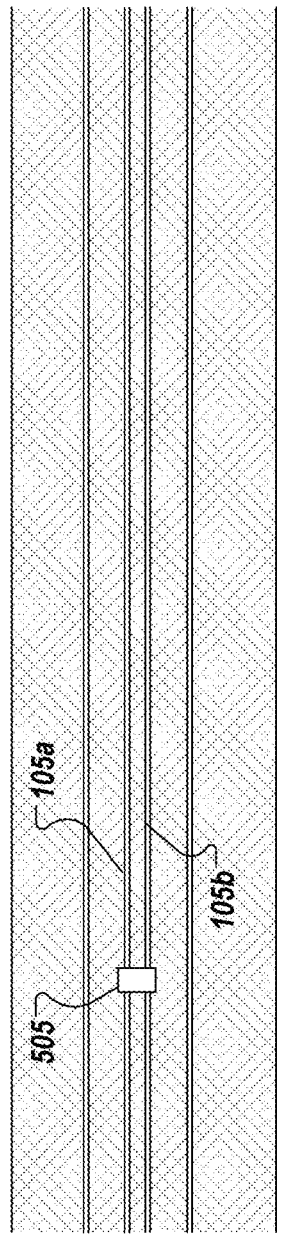
FIGS. 5C-5D are photographs of a first example touch sensor implemented using one or more liquid metal wires.
Figure 5D:
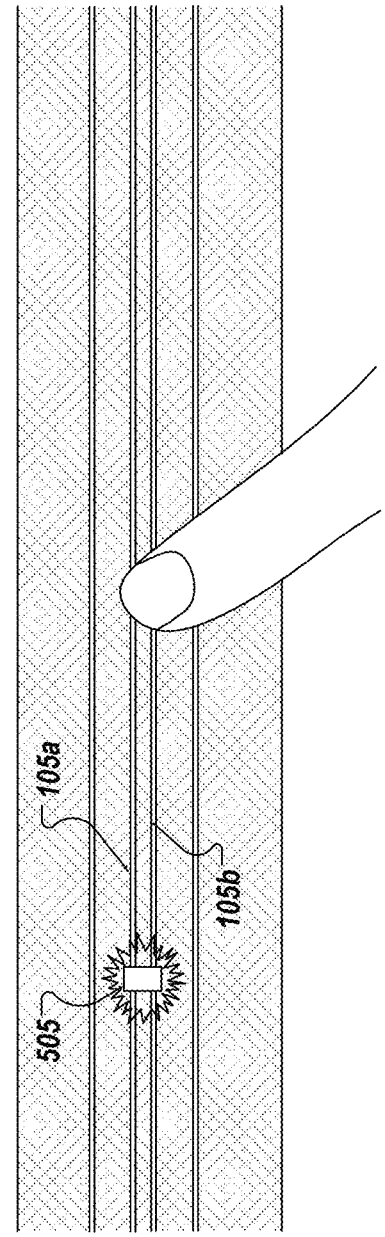

FIGS. 5A-5B are photographs illustrating an example implementation of a fluidic wire touch sensor. As shown in FIG. 5A, a fluidic wire 105 is provided to act as a touch sensor to activate a light emitting diode (LED) 505. When a section of the fluidic wire is depressed (e.g., by a human finger, as shown in FIG. 5B) a change in the electrical characteristics of the fluidic wire may be detected to cause the LED to illuminate. Note that the wire may be depressed at any point along its length to potentially cause the LED to illuminate. In like manner, touch sensors and touch arrays may be implemented using one or more fluidic wires to enable a touch control that does not necessarily require a precise touch event (e.g., the touch of a specific button or touch pad region). In other implementations, such as described below in the example of FIG. 6, a mesh, weave, or other collection of wires may be provided and oriented to provide more complex touch interfaces. Further, as shown in the photographs 500c-d of FIGS. 5C-5D, the individual fluidic wires (e.g., 105a-b) may be woven, adhered, or otherwise attached to a substrate, such as fabric or another material in various applications. Pressing one or both of the fluidic wires 105a-b, may actuate an LED 505 (or other device, depending on the application), as in the example of FIGS. 5A-5B, among other example implementations.

Figure 6:
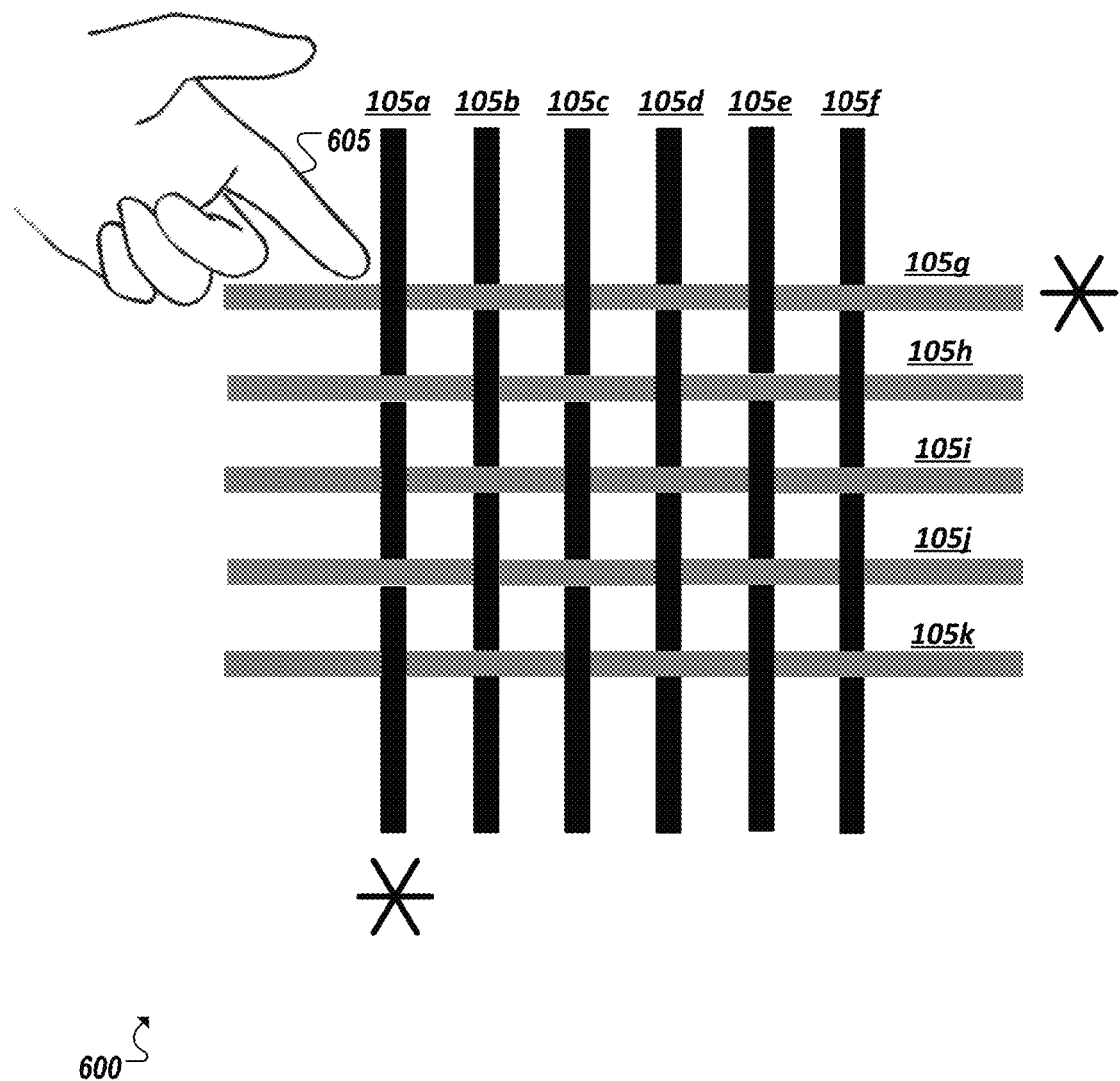
FIG. 6 illustrates a simplified schematic diagram of another implementation of a liquid metal wire touch sensor system.

As shown in the particular example of FIG. 6, in some implementations, a combination of multiple fluidic wires (e.g., 105a-k) may be utilized within a single article to provide a variety of different possible touch combinations and corresponding information relating to these touch events. For instance, in the example of FIG. 6, a grid pattern may be implemented in an article with some of the fluidic wires (e.g., 105a-f) in a first orientation and the remaining fluidic wires (e.g., 105g-k) in another (e.g., substantially orthogonal) orientation. As shown in the example of FIG. 6, a touch event (e.g., 605) may cause two or more wires (e.g., 105a and 105g) to be depressed concurrently or close together in sequence, allowing the position of the touch (e.g., in an x- and y-plane) to be more precisely located. In some cases, touches between adjacent parallel wires (in either the x- or y-direction) may also be measured, for instance, due to the touch affecting a capacitance measurement between the two fluidic wires, to allow these touches to also be registered.

Multi-fluidic wire touch arrays may be utilized in a variety of applications. As an example, a touch screen may be implemented in a section of fabric or paper using a collection of fluidic wire touch sensors (such as in FIG. 6) such that multiple different "buttons" may be implemented in this section of fabric or paper. For instance, an array of fluidic wires may be woven into a garment to implement a touch screen on a pant leg, shirt, glove, or other article of clothing. In another example, an array of fluidic wires may be woven into a section of wallpaper or other floor or wall covering, allowing a multi-function, multi-button smart home touch interface to be implemented using the touch sensors. In other instances, other multi-wire sensors may be provided, allowing for various touch locations to be detected (e.g., beyond uniform grid or other patterns). For instance, a variety of fluidic wires may be woven into a garment or artificial muscle allowing for touch instances to be detected at various locations on a user's body, among other example implementations and applications.

As noted above, fluidic wires utilized to register and detect touch events may be connected to a microcontroller or other circuitry to measure and detect changes in resistance, capacitance, inductance, and/or impedance of circuits including the fluidic wires. In some cases, when the change exceeds a particular threshold in scale or time, the microcontroller or other hardware- and/or software-implemented logic may generate a signal to indicate the touch event. Such signals may actuate other devices or components of a system and may be monitored for instance by hardware and or firmware for more advanced analytics, among other example uses. For instance, turning to FIG. 7, a simplified schematic diagram 700 is shown illustrating an example implementation of a touch detection circuit including a liquid metal wire 105 utilized for a touch sensor. The circuit may further include a resistor 705 (e.g., connected to ground 710) to implement a voltage divider, with a microcontroller 100 providing detection logic to detect changes in the voltage measured across the fluidic wire 105 to determine that a corresponding touch event has occurred. The example circuit 700 shown in FIG. 7 may effectively measure the resistance of a fluidic wire. More specifically, in this particular example, the fluidic wire 105 is connected from a constant voltage source to an analog input 715 on a microcontroller. A resistor 705, in this example, may be placed from that same analog input to ground, forming a voltage divider, and the voltage is sampled at this analog input using an analog-to-digital converter circuit at the microcontroller 100. When force is applied to the fluidic wire 105, thereby shrinking the cross-sectional area, the electrical resistance of the fluidic wire 105 increases. This changes the voltage drop across the resistor 705 in this circuit. When a threshold in voltage change is detected, the microcontroller 100 can generate signal to be provided to monitoring logic, trigger an action, among other uses.

Figure 8:
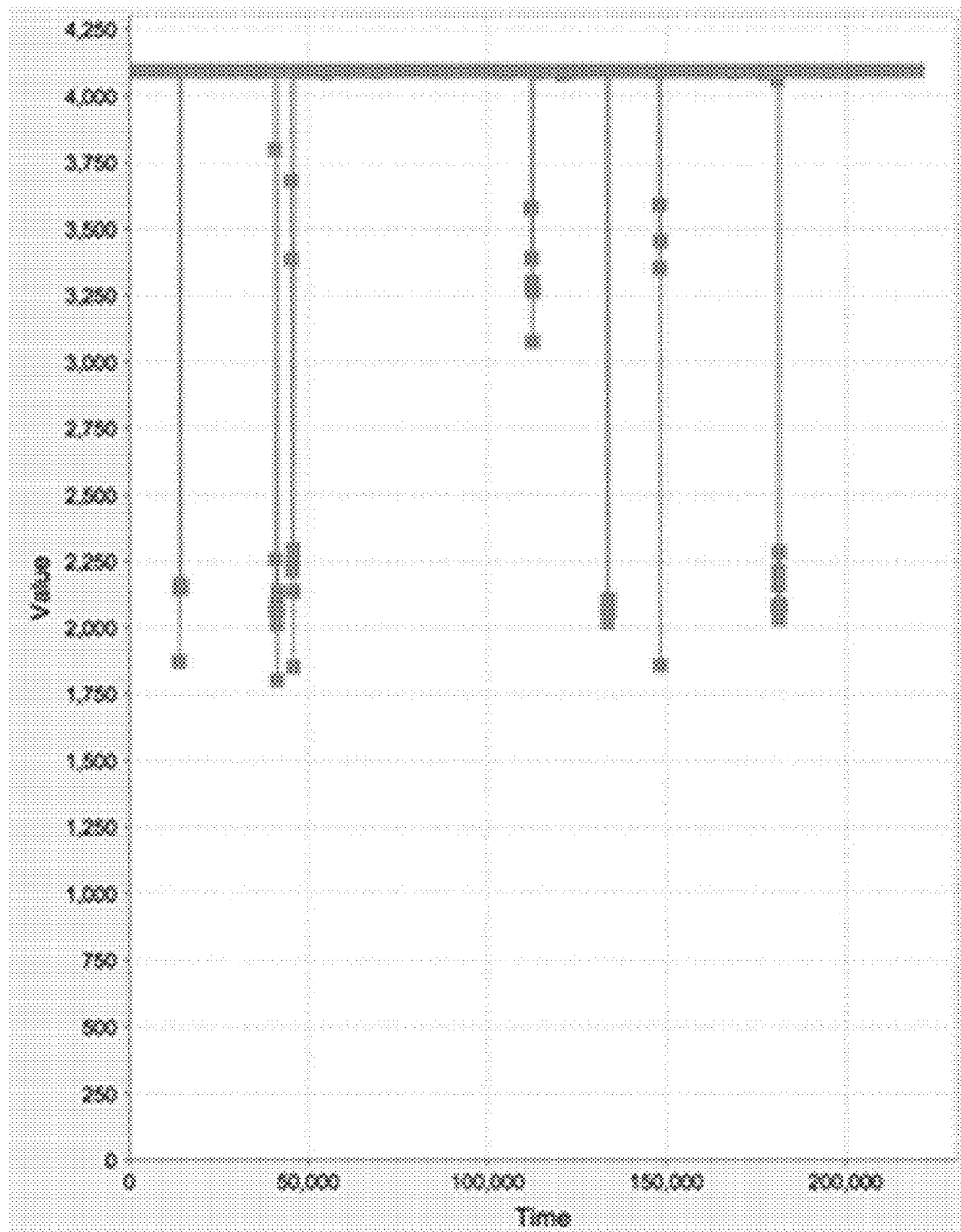
FIG. 8 is a graph illustrating example touches measured using an example touch detection circuit.

Turning to FIG. 8, a plot 800 is illustrated showing a voltage reading from a microcontroller sensing touch events on a fluidic wire. In this case, a constant voltage source is applied to one side of a stretchable liquid metal wire, with the other end being input to an ADC on a microcontroller. The voltage input over time is sampled by the ADC. Whenever the reading drops below a pre-defined threshold (due to a resistance increase from physically pressing the wire), a touch event is detected and an action is executed. For instance, as shown in the examples of FIGS. 5A-5D, an LED may be turned on in response to detecting a touch event. The plot of FIG. 8 shows a plot of the ADC reading over time, clearly showing a drop in the reading every time the wire is pressed.

Figure 7:
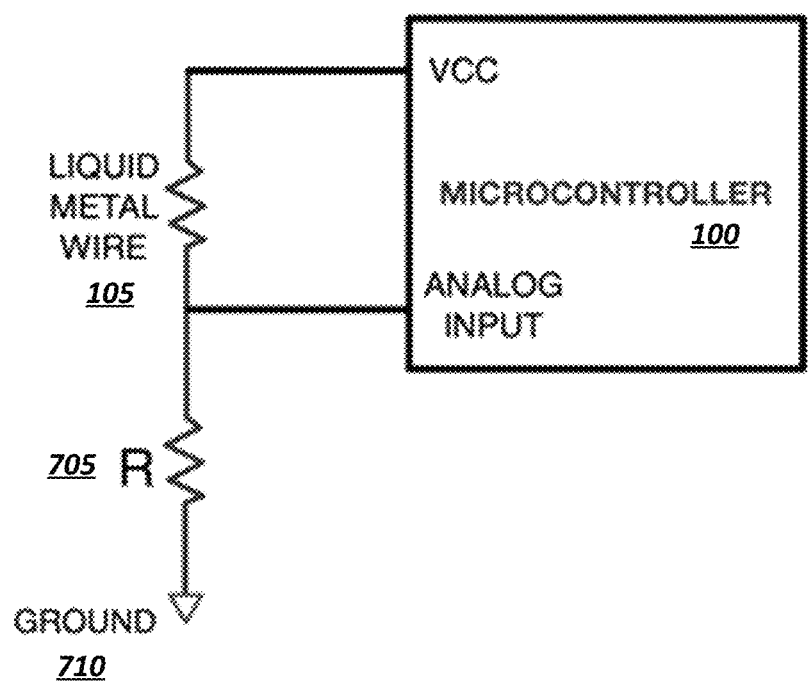
FIG. 7 illustrates a simplified schematic diagram of an example touch detection circuit.
Figure 9A:
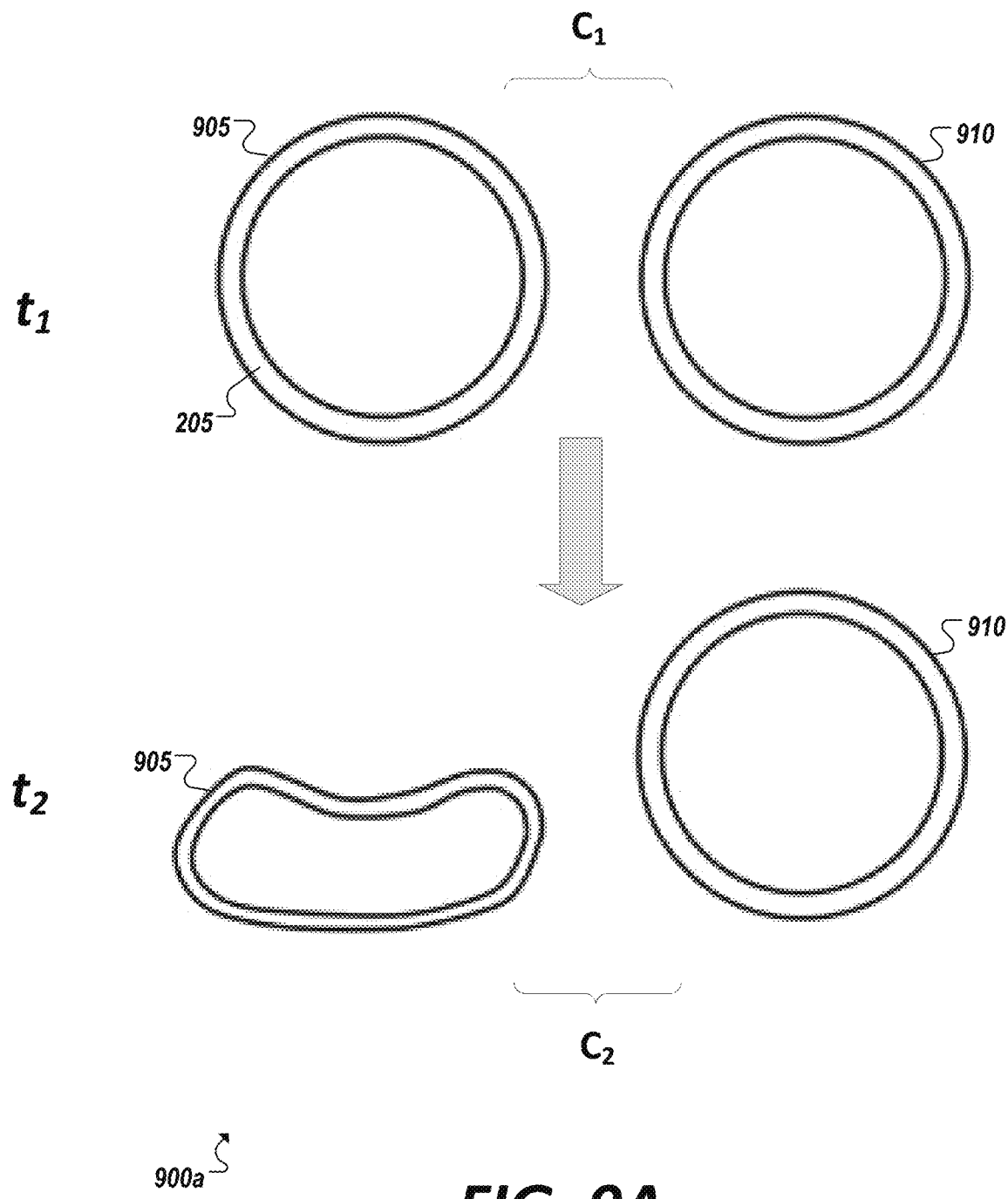
FIG. 9A is a simplified block diagram illustrating use of an example touch sensor implemented using one or more liquid metal wires.
Figure 9B:
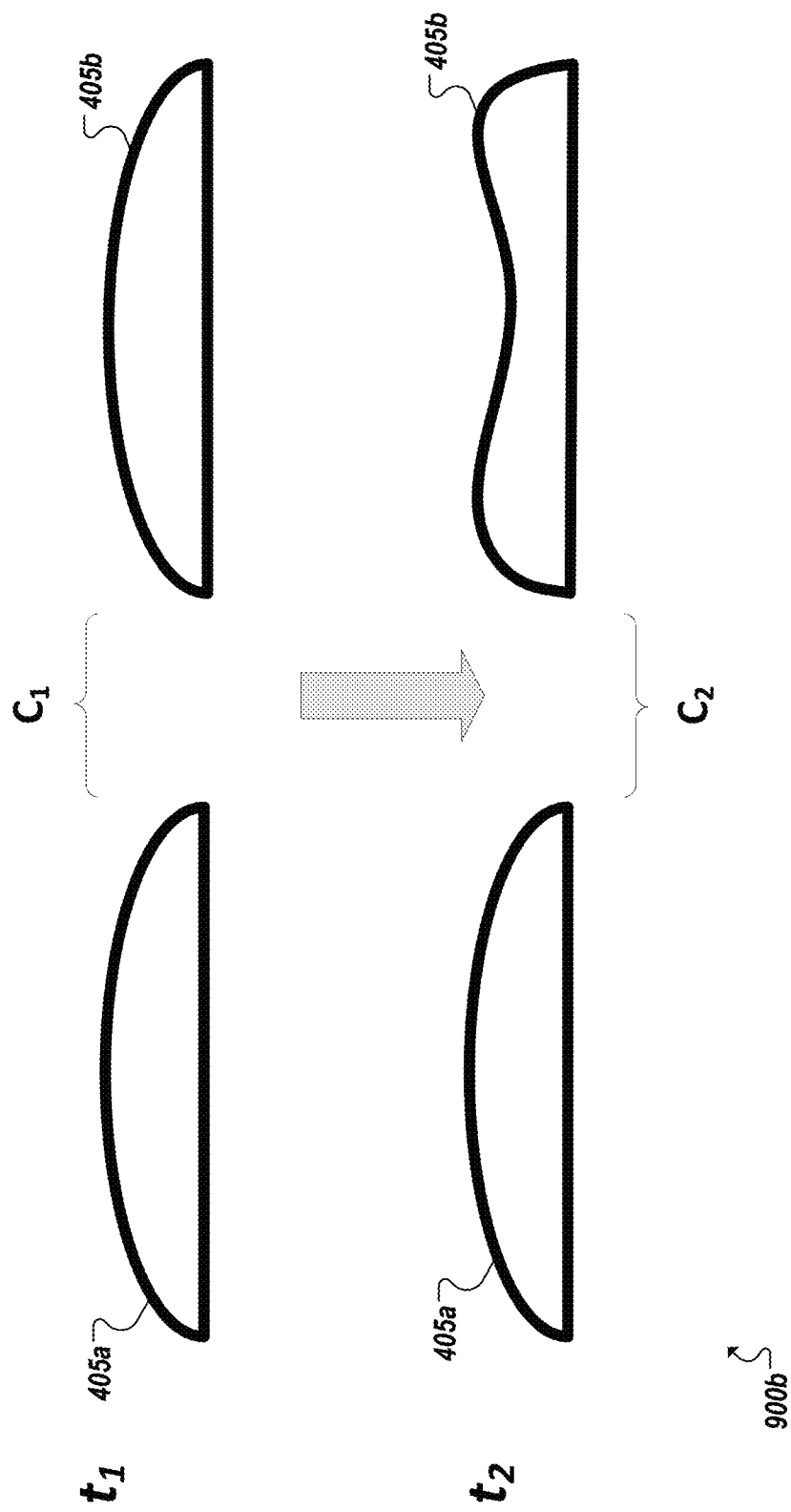
FIG. 9B is a simplified block diagram illustrating use of an example touch sensor implemented using one or more liquid metal bubbles.

While the example of FIG. 7 illustrated the measurement of resistance changes caused from depression of an example fluidic wire touch sensor, other characteristics may additionally or alternatively be measured to be used as the basis for determining a touch event. For instance, as shown in the simplified block diagrams 900a-b of FIGS. 9A-9B, capacitance may be measured between two liquid metal cavities. For instance, in the example of FIG. 9A, two cross-sectional views are shown of portions 905, 910 of one or more fluidic wires which are placed in proximity to each other such that an electrical field may be measured between the wires 905, 910. These views may be of portions of the same fluidic wire or of two separate fluidic wires. When directed pressure is not applied to the portions 905, 910 of the fluidic wire(s) (e.g., at time $t_1$) the portions may maintain a particular geometry consistent with the geometry of the capillary covering (e.g., 205) of the wire (which may be round, as in the example of FIG. 9A, or of another cross-sectional geometry (e.g., square, rectangular, triangular, hexagonal, irregular, etc.)). Capacitance (e.g., $C_1$) may be measured between the two portions 905, 910 of fluidic wire, representing the inherent capacitance $C_1$ of the circuit (i.e., when no touch is occurring). As further illustrated in FIG. 9A, if one or both of the fluidic wire sections (e.g., 905, 910) are pressed (e.g., as shown at time $t_2$, when fluidic wire section 905 is pressed), the cross-sectional area of the pressed wire section is changed, as well as potentially the distance between the fluidic wire sections and the dielectric between them, resulting in a change in capacitance (e.g., $C_2$) measured between the two fluidic wire sections 905, 910 at time $t_2$. Indeed, in some implementations, a change in capacitance may even be caused by a touch (e.g., a finger) positioned between the wire (or other cavity) sections, due to the change in the dielectric caused by the foreign object. Similar principles may be applied to non-wire fluidic cavity implementations, such as shown in FIG. 9B, where capacitance changes may be measured between two blister or bubble liquid metal cavities (e.g., between cavities 405a-b, with a change being detected based on the depression of cavity 405b at time $t_2$), among other examples.

Figure 10:
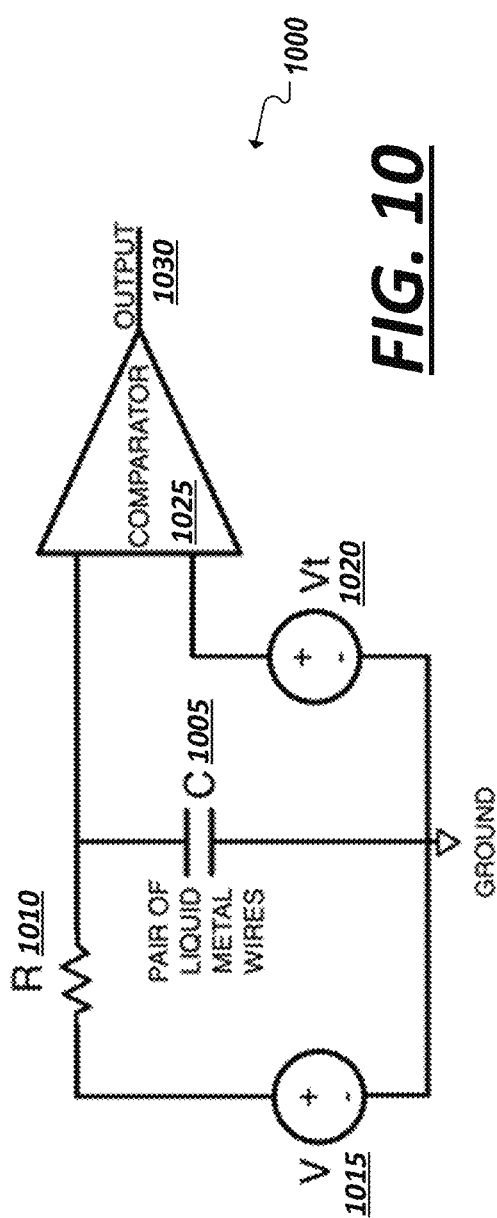
FIG. 10 illustrates a simplified schematic diagram of an example touch detection circuit.
Figure 11:
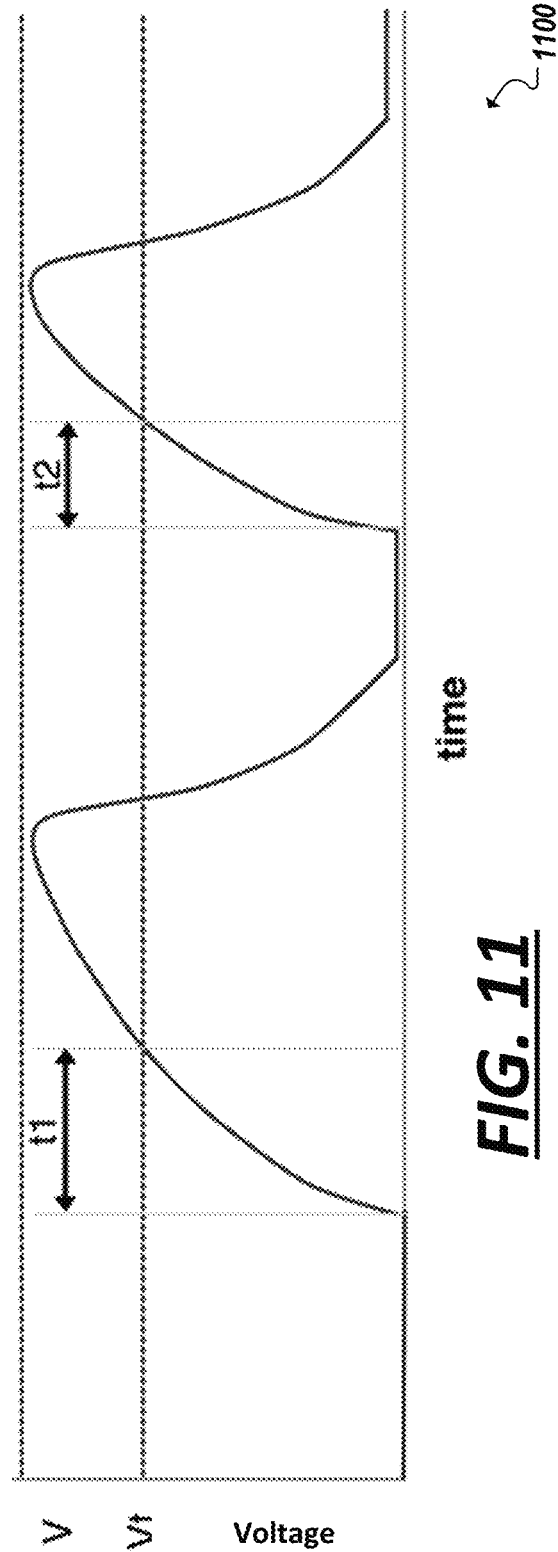
FIG. 11 is a graph illustrating example touches measured using an example touch detection circuit.

FIG. 10 is a simplified schematic diagram 1000 illustrating an example implementation of a circuit to measure changes in capacitance between sections of fluidic wire utilized to implement a touch sensor. The example capacitance meter circuit may be implemented, for instance in a microcontroller connected to and the fluidic wire(s). In this implementation, the capacitance between sections of fluidic wire may be found by measuring the time it takes for the capacitor (formed by the two or more sections of fluidic wire) to charge, defined as the time constant. The time constant (TC) is proportional to the capacitance (TC=R*C), and can therefore be used to compute the capacitance. In the circuit in this diagram, a pair of sections of fluidic wire is represented as a capacitor 1005. A resistor 1010 may be placed in series, and a voltage source (V) 1015 is applied across this RC circuit in order to charge the fluidic wire capacitor. The voltage Vc measured across the capacitor 1005 is compared with a constant voltage source (Vt) 1020 using a comparator circuit 1025. In this example, when a touch event causes the voltage Vc to pass Vt, the comparator 1025 may generate a signal at its output 1030 indicating a touch event. In such implementations, the comparison can be either analog (using an analog comparator to detect when one signal has a higher magnitude than the other), or digital (using an ADC to sample the voltage across the capacitor and detect when it passes the specified threshold). As shown in the graph 1100 illustrated in FIG. 11, the time constant can then be computed as the difference in time from when the voltage source (V) was applied to the RC circuit, and when this voltage passed Vt. The capacitor is then discharged. This process may be repeated, and the capacitance for each successive recorded time constant may be recorded with the previous recording in order to detect a change in capacitive due to touching or pressing of the fluidic wires measured in the system.

Figure 12:
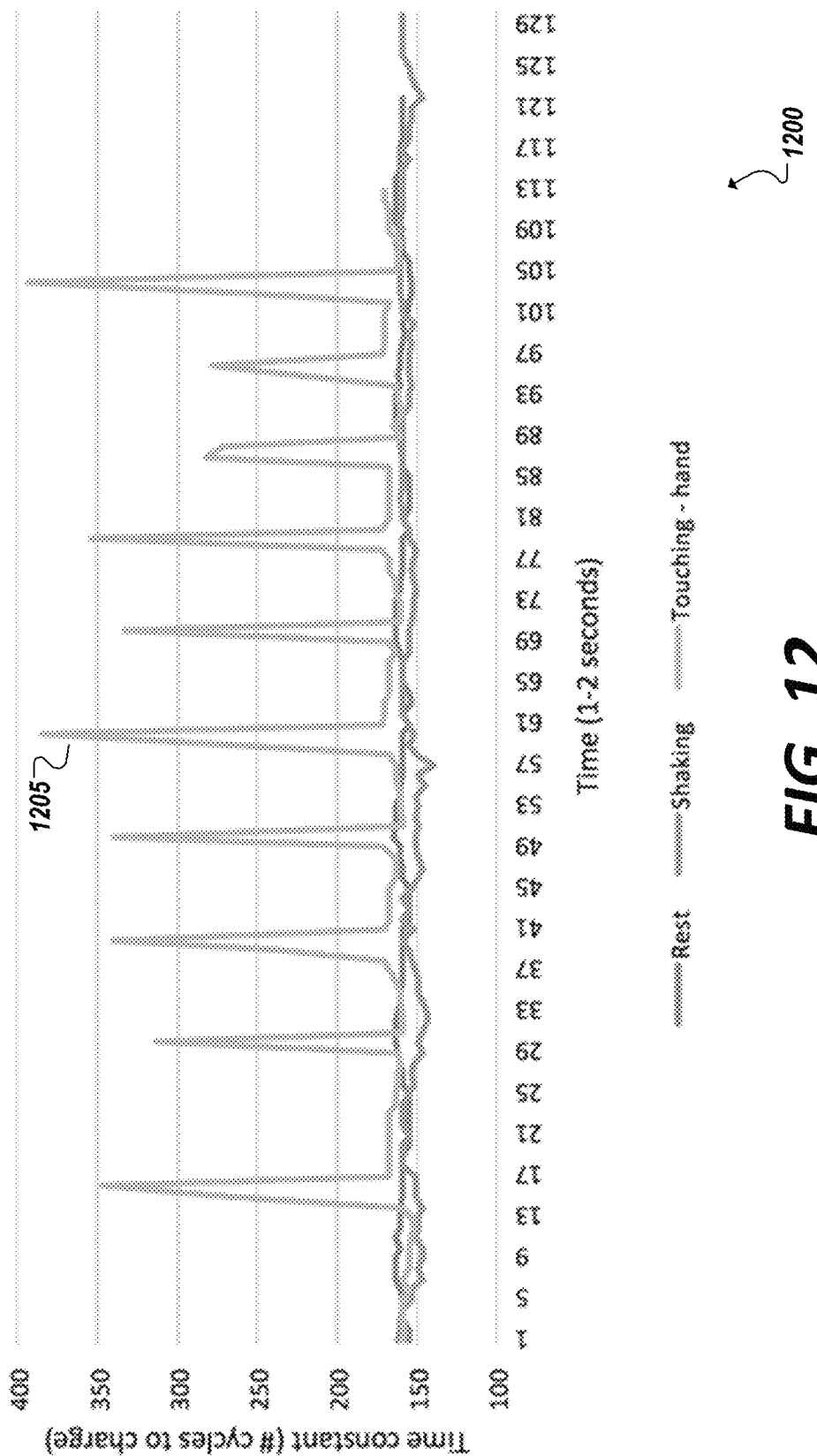
FIG. 12 is a graph illustrating measuring touches and movements measured using an example touch detection circuit.

FIG. 12 illustrates a graph 1200 illustrating the measuring of capacitance between two or more sections of fluidic wire in connection with observed activities involving a garment in which the fluidic wire is woven as a fiber of the garment. In this particular example, a microcontroller with a built-in analog comparator is used. A general purpose input/output pin is used to supply the voltage V (using a 3V source) for charging the fluidic wire capacitor, and triggered to ground for discharging the capacitor. A timer was used to count the number of clock cycles from the time the voltage V was applied and when Vc passed Vt (using a constant 2V source). The plot in FIG. 12 shows results of the recorded time constant over time using this implementation applied to a pair of liquid metal wires that had been knitted into fabric (e.g., as in FIGS. 5C-5D). The plot includes the fabric at rest (without touching the fibers), when the fibers are touched repeatedly (noted by the peaks (e.g., 1205)), and when the fabric is being shaken (showing that incidental movement does not trigger a touch).

It should be appreciated that fluidic wire-based touch sensors may be utilized in a variety of diverse applications. In some cases, the fluidic wires being used may double as the signal or power wires being used in the wire's application (e.g., a speaker wire for a set of headphones), while also serving as a touch control for the application. In other cases, additional lumens or fluidic wires may be added (e.g., in addition to power or signaling wires) for specific use as a switch or other touch sensor. Fluidic wire-based touch sensors can be used in audio or smart phone applications, providing a means to detect physical pressure to execute a command (such as answering a phone or increasing volume). In addition, it can be used to encode specific executions, for example requiring a wire to be physically pressed or squeezed once to perform one action and twice to perform another. One can apply physical pressure at any point along a wire, not being limited to using a physical switch (as is often used in audio players or smart phones). The wire of an electronic device itself can serve as the physical pressure sensor.

Additionally, fluidic wire-based touch sensors can be used in textile applications. Due to the shape-changing intrinsic properties of the liquid metal devices being used as the physical pressure sensor (in addition to their use as interconnects for signal transmission within an electronic device), they are easily incorporated into textiles for power or data transmission to electronics (such as lighting, heating, fitness tracking, or audio devices) in clothing and other accessories (such as heated gloves or lighted athletic apparel). In such an application, wires for sensing can be woven as a single or parallel set of wires, allowing the impedance between any set of arbitrary wires to be measured and used for performing an action within a circuit. Using a mesh of liquid metal wires woven into the fabric or attached to the surface, impedance change due to shape deformation of adjacent wires or wires placed on top of each other can be measured. For example, this could be used in a shirt to detect if one is touching one body part vs. another, and execute different tasks based on the location of the applied pressure.

In addition to sensor-enhanced fitness apparel, applications of fluidic-wire-based sensors may also be applied to medical device applications. For example, incorporating stretchable liquid metal wires into a tight-fitting shirt or chest band can be used to detect breathing for inductive plethysmography devices, or for monitoring heart rate, by detecting the change in impedance due to the stretch of the wire that results from breathing or heart beating. In some instances, such vibrations can be also detected wirelessly through the same principle of the RADAR: using an external antenna that emits radiation, the vibrations and shape variations of the liquid metal fibers change the resonant frequency of the fiber and therefore they can be detected by the same external antenna.

The orientation of the wires can be set to enhance the measurement, or to help detect the location of the physically applied pressure. This is applicable whether reusing the wires being used for signal or power transmission, or through the addition of wires specifically for this switching application. In some implementations, fluidic wire-based touch sensors may be utilized to cause signaling to another computing device (e.g., a smartphone or IoT system). In some cases, signaling may be provided by a fluidic wire-based antenna, such as utilizing features described in U.S. Pat. No. 8,587,493 (incorporated by reference herein), among other examples.

Figure 13:
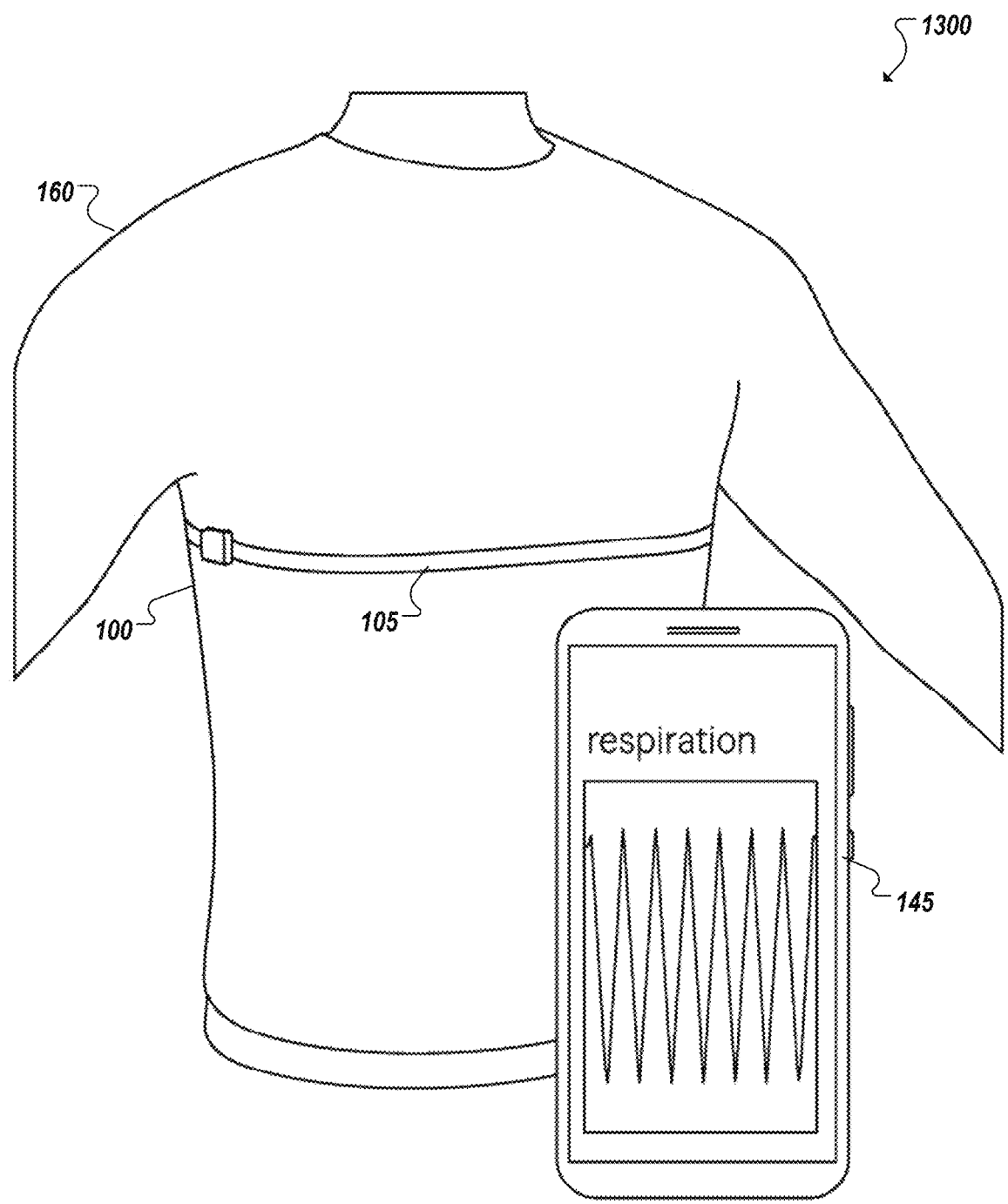
FIG. 13 is a diagram of a garment including a sensor implemented using one or more liquid metal wires.

Turning to FIGS. 13-16, diagrams 1300-1600 are shown illustrating example implementations of garments 160, which incorporate one or more sensor devices utilizing fluidic wire-based sensors, such as discussed above. As noted above, fluidic wires may be used to detect biometric information, such as inhalation/exhalation of the wearer, muscle engagement, joint flexion/extension, among other attributes. For instance, FIG. 13 shows a shirt garment 160 incorporating one or more fluidic wire loops (e.g., 105) located near the chest and rib cage of the wearer. When a user inhales and exhales, the fluidic wire 105 may be stretched (e.g., during inhalation) and then relaxed (e.g., during exhalation), allowing respiration events, their frequency, timing, and depth to be measured. Ends of the fluidic wire(s) used to implement the loop may be connected to a sensor block 100, implemented at least in part in hardware circuitry, which may detect electrical attributes (e.g., impedance) of the fluidic wire(s) 105 as well as changes in the electrical attributes over time. The sensor block 100 may also be attached to the garment to allow the system to be wearable. The sensor block 100 may generate sensor data corresponding to the attributes detected for the fluidic wire and may further include communication circuitry to communicate (e.g., wirelessly) the sensor data to one or more supporting devices 145 (e.g., a smartphone, personal computer, gateway (e.g., to send the data on to a remote (e.g., cloud-based) service), etc.). The supporting device 145 may process the sensor data to determine biometric readings of the wearer of the garment 160 based on the sensor data derived from the stretching and relaxing of the fluidic wire 105 implementing a respiration sensor in a wearable. In some instances, the supporting device 145 may generate respiration reporting data as an output and present the corresponding biometric information to a user. Further, respiration result data may be combined with other information, such as global positioning data, accelerometer data, motion detection data, or other biometric data to derive other outputs and results, which may be of benefit to a user.

Figure 14:
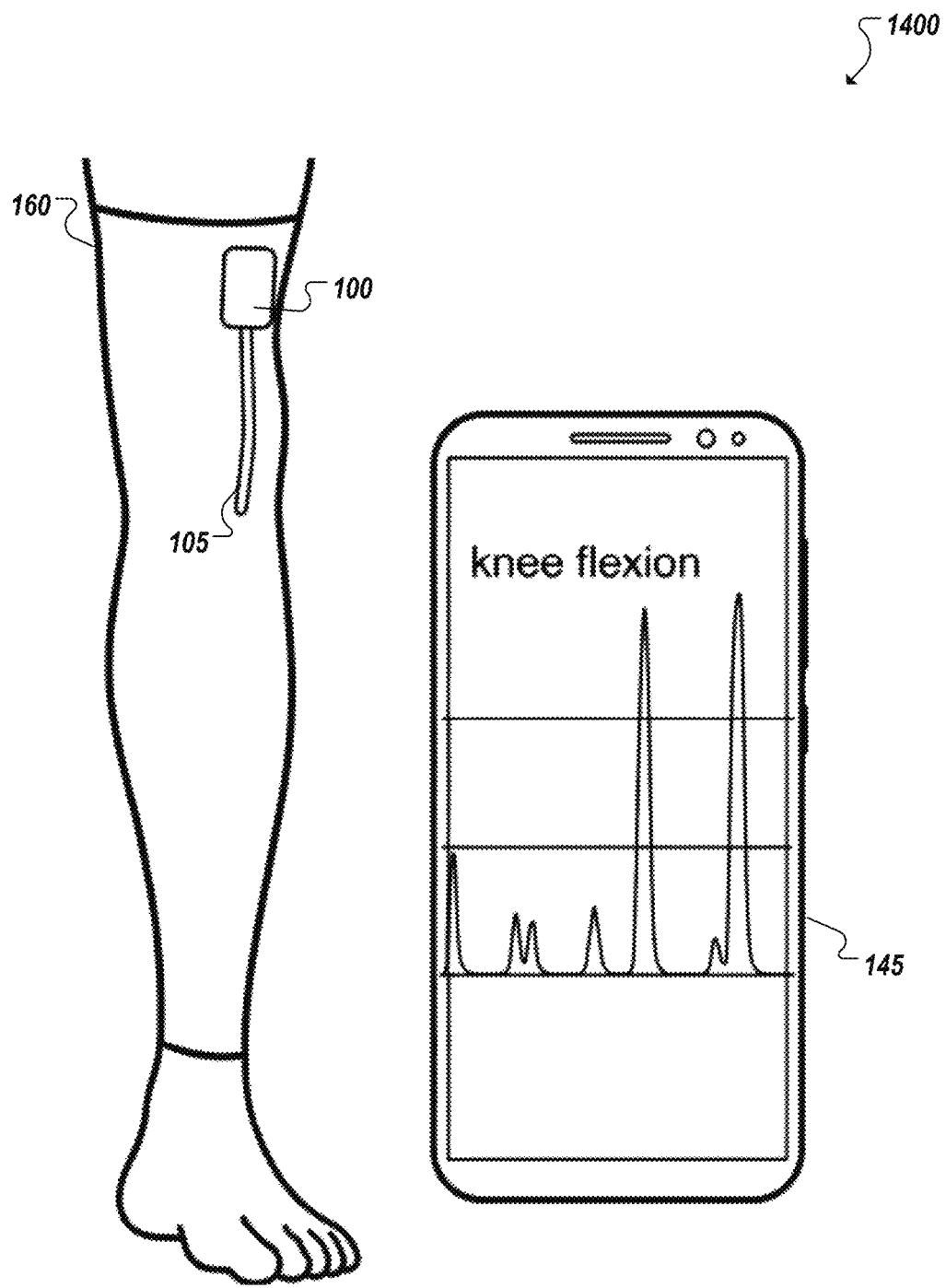
FIG. 14 is a diagram of a first leg garment including a sensor implemented using one or more liquid metal wires.

Turning to FIG. 14, fluidic-wire-based sensors may also be implemented and integrated within other wearables to detect other biometric information. As another example, a leg sleeve garment 160 is shown. In some cases, the leg sleeve may be implemented as a sleeve, in the leg(s) of pants or leggings, as a stocking, among other examples. In this example, a length of fluidic wire 105 is integrated within the leg sleeve of a garment to correspond to the location of a wearer's knee (e.g., located to span the joint in a substantially linear manner substantially perpendicular to an axis of rotation of the joint). The fluidic wire 105, in some implementations, may be implemented as a loop, which begins at sensor block 100, extends to a region of the sleeve 160 corresponding to below the knee of the wearer and then tightly looping back to return to connect (at its other end) to the sensor block 100. In such an implementation, when the wearer bends, or flexes, their knee, the fluidic wire is stretched and the sensor block 100 may detect a corresponding change in the electrical attributes of the fluidic wire (e.g., a change in impedance detected by circuitry of the sensor block). For instance, the sensor block 100 may include a current source. To measure and detect changes in the fluidic wire (e.g., compression or stretching of the fluidic wire) the sensor block may pass the current through the fluidic wire, allow for settling time, and then measure voltage across the fluidic wire (e.g., using an analog-to-digital (A/D)) convertor. The resistance, or impedance, from the voltage may then be measured at the sensor block 100 and changes manifest within the fluidic wire based on changes to the measured impedance and/or voltage, among other example implementations.

Continuing with the discussion of the example of FIG. 14, while a leg sleeve is shown in this example to detect flexion of joints (and/or contraction of muscles) in the leg of the wearer, it should be appreciated that similar principles and sensors may be integrated in other garments (e.g., shirts, gloves, socks, etc.) to detect the flexion of other joints or contraction/elongation of other muscles of the wearer (e.g., wrist, fingers, elbow, shoulder, ankles, hips, etc.). The sensor block 100 may generate sensor data to describe the detected attributes and communicate the sensor data to one or more supporting devices (e.g., 145) for further processing and detection of instances of knee flexion, including the depth of the knee flexion, the duration of the knee flexion, the frequency of knee flexion, and even infer the corresponding physical activity (e.g., running, jumping, swimming, biking, running, etc.) and attributes of the performance of the physical activity (e.g., number of steps, intensity of the flexion-related acts, frequency or turnover of the wearer, etc.). Such readings can likewise be combined with other measurements provided by other sensor devices monitoring the user, including other, similar flexion readings provided using fluidic-wire-based sensors at other joints of the wearer.

Figure 15:
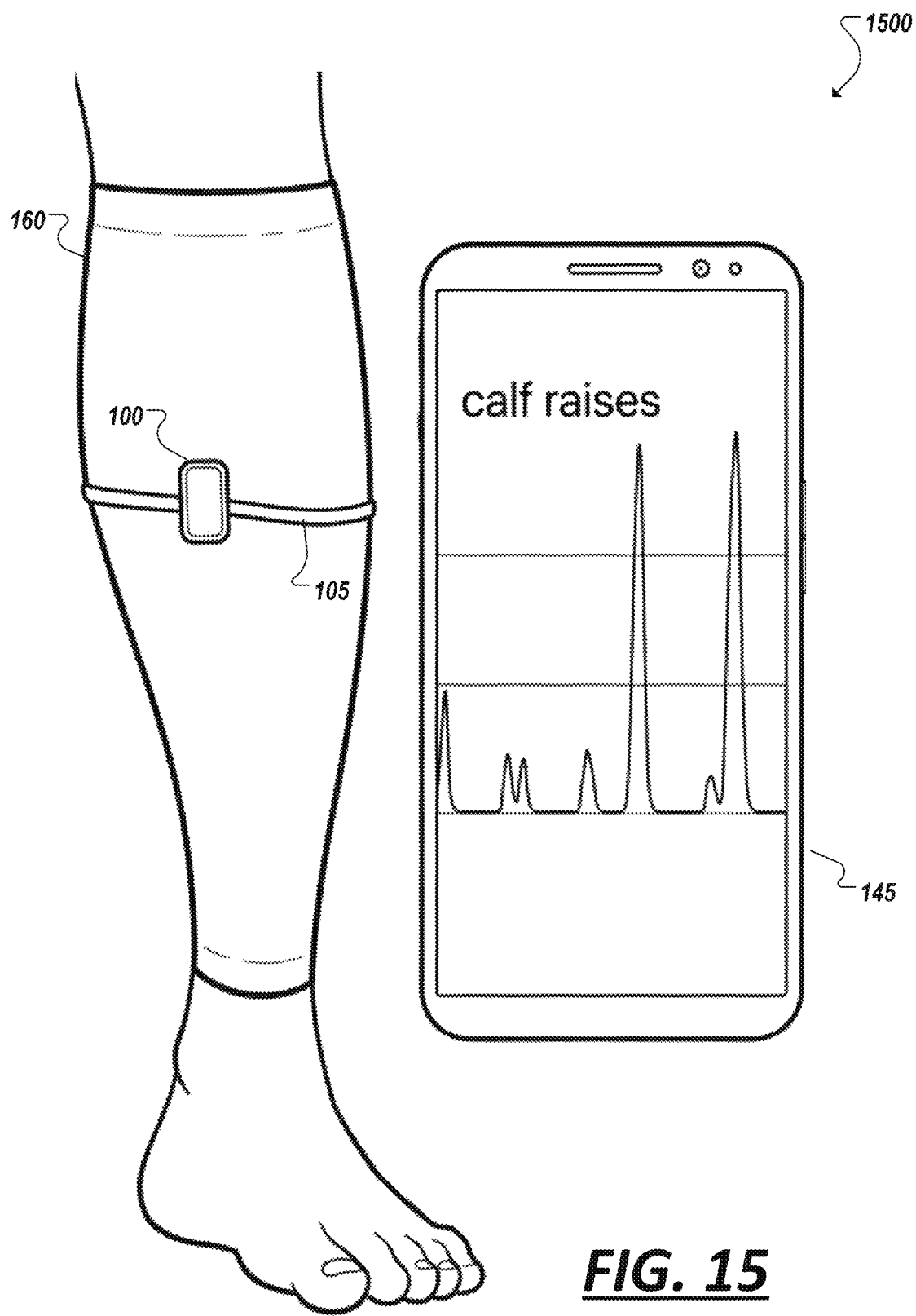
FIG. 15 is a diagram of a second leg garment including a sensor implemented using one or more liquid metal wires.

Turning to FIG. 15, an additional example of a fluidic-wire-based sensor is shown. In this example, one or more fluidic wires (e.g., 105) implement a loop integrated within or otherwise attached to a leg sleeve portion of a garment 160 and located to correspond to a calf muscle of a wearer. As a user engages their lower legs and calf muscles (e.g., in a step, jump, calf raise, etc.), the calf muscles may elongate and contract causing the fluidic wire band 105 positioned around the calf muscles to be stretched (e.g., during a contraction phase of the movement). Instances of muscle contraction and elongation can thus be detected based on changes in the electrical attributes of the fluidic wire(s) 105 resulting from the changes to the cross-sectional dimensions at portions of the fluidic wire based on the stretching of the fluidic wire, as measured using sensor block 100. Similar fluidic-wire-based sensors may be implemented to measure contraction, elongation, engagement, and other muscle movements of other muscle groups, such as hamstring/quadricep muscles, abdominal muscles, forearm muscles, bicep/triceps muscles, etc. The sensor block 100 may likewise generate corresponding sensor data to deliver to a cooperating or supporting device 145, for additional processing (e.g., to detect calf raises performed by the wearer).

Figure 16:
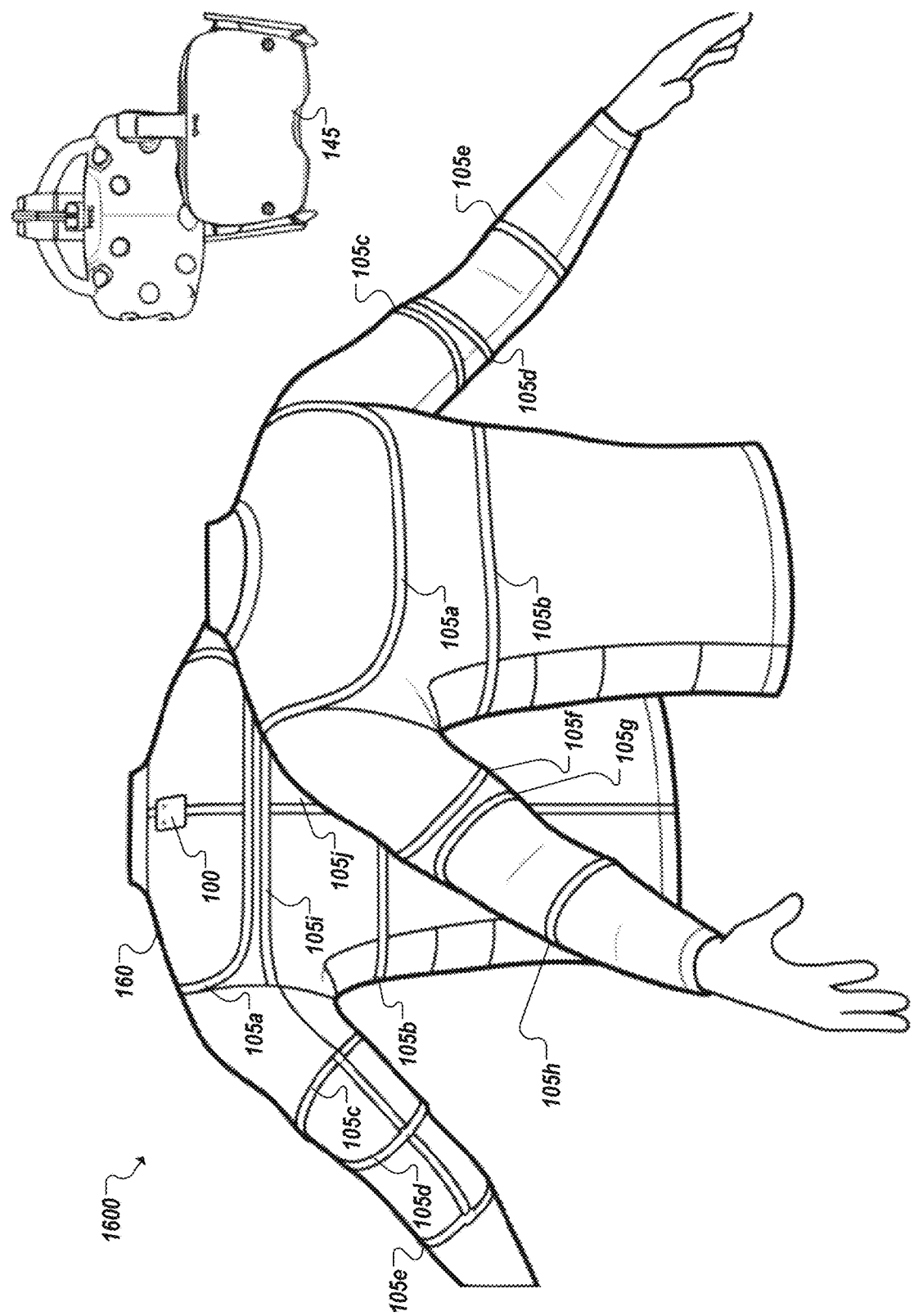
FIG. 16 is a diagram of a garment including multiple sensors implemented using multiple liquid metal wires.

It should be appreciated that, in some implementations, a sensor block 100 may include more advanced logic to perform additional processing on sensor data generated based on the electrical attributes of fluidic wires connected to and sensed by the sensor block 100 circuitry. For instance, a sensor block 100 may include logic, in some implementations, to perform all or a portion of the processing that would otherwise be performed by a supporting computing device or system (e.g., 145). Further, more than one set of fluidic wires may couple to and be monitored/measured by circuitry of a sensor block 100 element. For instance, multiple fluidic wires (e.g., 105*a-j*) corresponding to the measurement of multiple different biometrics or body parts of a user may be positioned throughout a garment and the multiple fluidic wires (e.g., 105*a-j*) may connect to and be monitored by the same sensor block 100, such as illustrated in the example of FIG. 16. The lengths, cross-sectional dimensions (e.g., geometry, diameter, etc.), liquid metal used, and/or position of the various fluidic wires 105*a-j* may be respectively selected based on the corresponding biometric characteristic the fluidic wire 105*a-j* is to be used to monitor. For instance, the multiple fluidic wires may be used to measure a combination of joint flexion, joint rotation, muscle contraction, respiration, and/or other biometric attributes.

In the particular example of FIG. 16, a shirt device 160 is shown, which utilizes a collection of specially positioned fluidic wires 105*a-j* to detect multiple different upper body movements, including compound body movements, of the wearer of the shirt device 160. Similarly, other garments (e.g., pants, full-body suits, gloves, masks, socks, etc.) to detect the component movements of corresponding body parts of a user. For instance, a combination of fluidic wires' electrical attributes may be monitored to detect a collection of corresponding readings (e.g., readings contemporaneous in time and in a corresponding portion of the garment/body of the user). For instance, fluidic wire bands 105*g*, 105*f*, 105*h* may each measure muscle contractions at various points (or muscles or muscle groupings) along the length of the right arm of the wearer. Further, attributes of fluidic wire 105*i* may be used to detect flexion of the wearer's elbow and attributes of fluidic wire 105*a* may be used to detect movement of the user's shoulder and/or back. The combined readings from fluidic wires 105*g-j* may be interpreted to corresponding to various forms of movements of the user's right arm based on the multivariate readings from the collection of fluidic wires 105*g-j*, such as the user reaching forward, reaching upward, throwing, waving, or otherwise moving the right arm based on combined movements of joints or muscles (e.g., the shoulder, wrist, and elbow) in the right arm as detected based on changes (e.g., stretching) in the physical form of the fluidic wires located near these portions of the right arm. Similar readings of other fluidic wires (e.g., 105*c-e*) may be utilized to detect types of movements in the left arm of the wearer, and so forth. Similar compound body movements may be detected in a wearer's lower body and hands in a wearable sensor device implemented as a lower body garment or glove, integrating multiple fluidic wires to sense the constituent movements of various muscles and/or joints in the lower body or hand, among other examples. Indeed, in some implementations, a multi-sensor garment may be utilized as a full-body controller, for instance, in association with a virtual or augmented reality system 145. In other applications, such a garment may be utilized as a controller for other computing systems, as a motion detection suit (e.g., for video special effects generation or rendering, kinesiological analysis, sports mechanics analysis, among other example uses), which may accurately detect various compound and complex body movements of the wearer from respective changes in electrical attributes of fluidic wires measured by one or more sensor blocks.

As noted above, sensor readings detecting changes in the electrical attributes of various fluidic wires (e.g., positioned on or within a wearable garment) may be correlated with particular biometric values or inferences, among other example information. A sensor block and/or supporting computing device may possess logic to perform such a correlation or inference from the detected electrical attributes and may be determine that a sensor reading or grouping of sensor readings (e.g., 1705) correspond to a particular biometric value (e.g., 1715). Indeed, such logic may be trained to correlate various fluidic wire electrical attribute readings with ground truth biometric values or other metrics. Indeed, logic may be trained to determine from one or a collection of fluidic wire electrical attribute value an output inference value, such a biometric value. As an example, in the example of FIG. 17A, a set of graphs 1705, 1710, 1715 are shown representing how sensor readings of electrical attributes of one or more fluidic wires attached to one or more sensor blocks may be correlated to breathing rate biometric values (e.g., 1715). Interpreting the sensor reading data (e.g., 1705) may also involve intermediate data processing (e.g., normalization, etc.) to prepare the sensor reading data 1705 for consumption by logic (e.g., in the sensor block or a supporting computing system external to a wearable or the sensor device) in determining biometric values (e.g., 1715) from the sensor reading data 1705. Indeed, the logic may be trained to identify that one or more sensor readings may be interpreted as a biometric event or value (e.g., in substantially real time), among other examples.

An interface or connector may be provided to connect liquid metal wires used in touch sensor applications, with other circuitry and logic (e.g., used to implement these touch sensors). In such devices, the liquid metal, such as liquid Gallium or alloys thereof, may be used as a current-carrying medium for transporting data and/or power. To use these devices with external electronics, an interface between the liquid metal and solid conductor leads of the external devices is required. This poses significant challenges in ensuring consistent electrical continuity between the external electronics and liquid metal device, filling the devices with the liquid metal, and sealing the connection point to ensure the liquid metal will not leak.

To address the concerns above, a device, or connector, may be provided to serve as an interface between the liquid metal and the electrical connector, or other external electronic devices having channels housing liquid metal. A conductive surface lines any amount of the inner surface of the channels, which extends outside the channel, allowing it to be accessed by external processes to form electrical connections from an external device to the liquid metal inside. The channels have opening(s) for connecting to liquid-metal devices. This allows for conductive liquid metal to extend into these channels and form an electrical connection with the conductive surface within this device, and therefore make an electrical connection with an external solid electrical connector. An opening may be added to the channels for filling this interfacing device and the liquid metal based devices with liquid metal, allowing for increased control of the filling process, as opposed to filling the devices prior to attaching to external solid contacts.

In some implementations, to attach to liquid metal devices, hollow tubes may protrude from the surface. Hollow tubes may refer to any set (single or multiple) of solid or flexible polymer, metal, or other material that are hollow and organized appropriately for fitting into multi-lumen tubing, a single or set of individual tubes, or other devices housing liquid metal, such as terminals for a flexible antenna. Such tubes may have any cross-sectional geometry depending on the specific application (e.g., square as shown in the example of FIG. 13, round as shown in the example of FIGS. 14 and 15, etc.). The individual tubes may be kept a distance apart from each other to separate the individual liquid metal conductors and allow for them to be inserted into the device housing the liquid metal. In some implementations, a surface with openings may be used without having these hollow tubes protruding, allowing for the liquid-metal-housing devices to be sealed against the surface, having the openings in these devices (e.g., tubing, flexible electronics, etc.) line up with the openings on an interfacing or connector device, and sealed using adhesive, UV welding, thermal fusion, solvent bonding, or any other example mechanism for sealing around each opening. This may also allow for devices that have needles or individual tubes to be inserted into this interfacing device or connector. In addition, a sleeve may be placed around this connection point with the liquid metal device in order to add structural integrity, or to limit flexibility or add rigidity (such as illustrated in the example of FIG. 10).

Continuing with the above example, these tubes, or openings, form channels within an interfacing device. These channels can have any geometry, extending the geometry of the liquid metal device it is connecting to (such as illustrated in the example of FIG. 13), or modifying the geometry throughout the channel to match the solid electrical connector it is interfacing with (such as illustrated in the examples of FIGS. 14-15). An opening to the channel allows for filling the channel, and liquid metal device it is attached to, with liquid metal. This opening may then be sealed with adhesive or by bonding a second piece of material that can either match the geometry of the opening or be placed against the surface. This bonding can be accomplished using adhesive, UV welding, thermal fusion, solvent bonding, or any other form of sealing to ensure that liquid metal does not leak out of the device. Additionally, this opening may be kept sufficiently small such that liquid metal is not able to exit, but large enough that a needle can be used to fill the device, serving as an inherent valve.

In some examples, channels may be either constructed of, or lined with (partially or fully) a conductive medium, such as, but not limited to, gold or nickel plating. This conductive contact may extend out of the device, allowing it to be connected to a solid electrical connector. This conductive surface can either be incorporated into the channel, or be part of an external surface, such as a PCB (such as in the examples of FIGS. 14-15). For instance, the channels may have an opening with the walls around this opening being sealed against liquid metal leaking. An opening in the channel allows for the channel to be exposed to the conductive surface rather than lining the channel itself.

In some implementations, an interfacing device, such as described above, may be universal, serving to fill, seal and cap the liquid metal devices, having external leads that can be treated as wire leads from a solid electrical device would be treated. By doing so, it may then be attached to connectors, such as USB, audio, lightening, etc., or to leads on other electrical devices that are available on the market, such as antennas, lighting, etc. Additionally, this device may be used as the connector itself by shaping the external solid conductive contacts into the geometries required by the application, incorporating this interfacing device and contacts of the appropriate connectors into a single electrical connector. Such connectors can expand the applications of liquid metal devices, such as integration in wearables, smart fabric and clothing, plug-and-play sensors and microcontrollers, among many other examples.

An improved interfacing device for use with liquid metal devices may possess example advantages over tradition solutions. For instance, through the use of conductive hollow channels with external solid leads, external electronics may interface with liquid metal filled devices as if they were solid conductors. As another example, the use of channels within such interfacing device allows for the reorganization of different leads from the liquid metal based device. This may be particularly useful for applications in which liquid metal is used in small tubing. The ability to change the channel geometry allows for it to be enlarged, simplifying post-processes for filling and sealing the device with liquid metal. As another example advantage, by using hollow channels and having the ability to inject the liquid metal after sealing a device to a solid external device, higher control over the filling of liquid metal may also achieved. When attempting to interface a liquid metal device with solid electronics using solid conductive pins, or other solid conductors that are inserted into the liquid metal, the pressure and/or volume of liquid metal inside a device can be difficult to control. By having a completely hollow system, which includes an opening for filling without having to insert the electrical contact into the liquid metal device, parameters such as volume or pressure of the liquid metal can be controlled using external filling systems, such as pressure-controlled syringe pumps, without concern for inserting a conductor after filling. Further, the devices described herein may allow for application-specific devices to be designed, with inherent conductivity built into channels for interfacing between the two devices. Additionally, by using hollow channels, liquid metal may be injected into the devices after sealing to the external connectors or other electrical devices. This may avoid the risk of leaking liquid metal during processes for attaching external electronics, among other example advantages.

Figure 17:
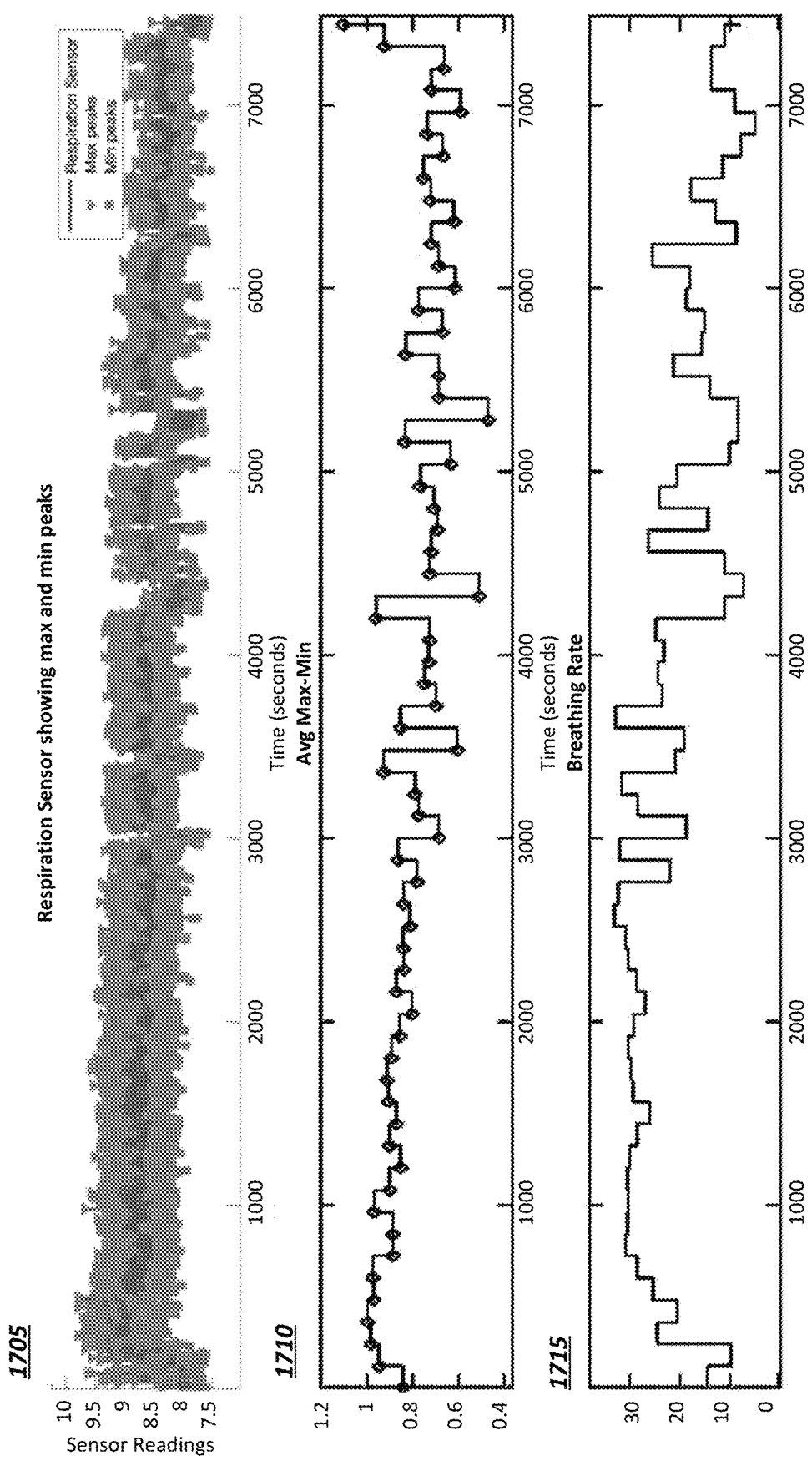
FIG. 17 are graphs illustrating the detection of biometric attributes from sensor data generated by one or more sensors implemented using one or more liquid metal wires.
Figure 18:
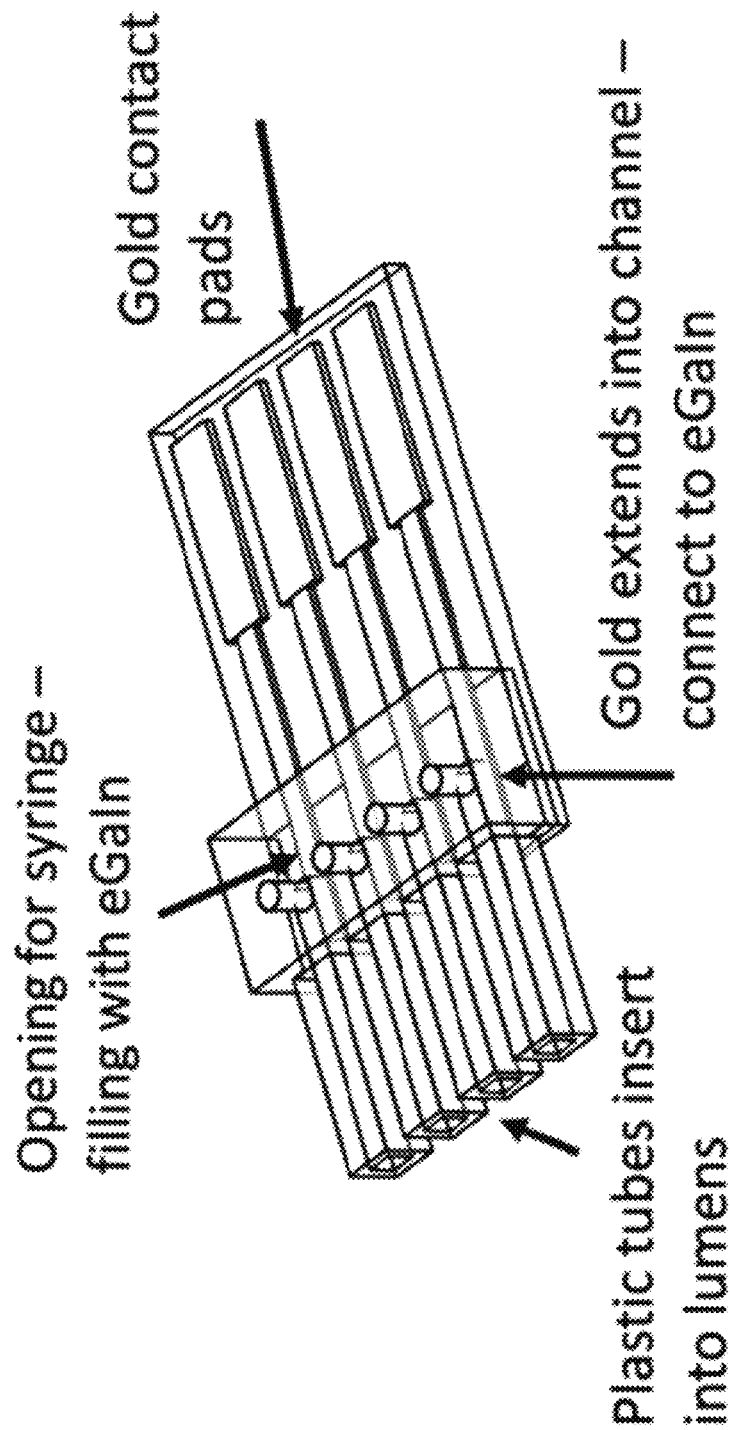
Figure 19:
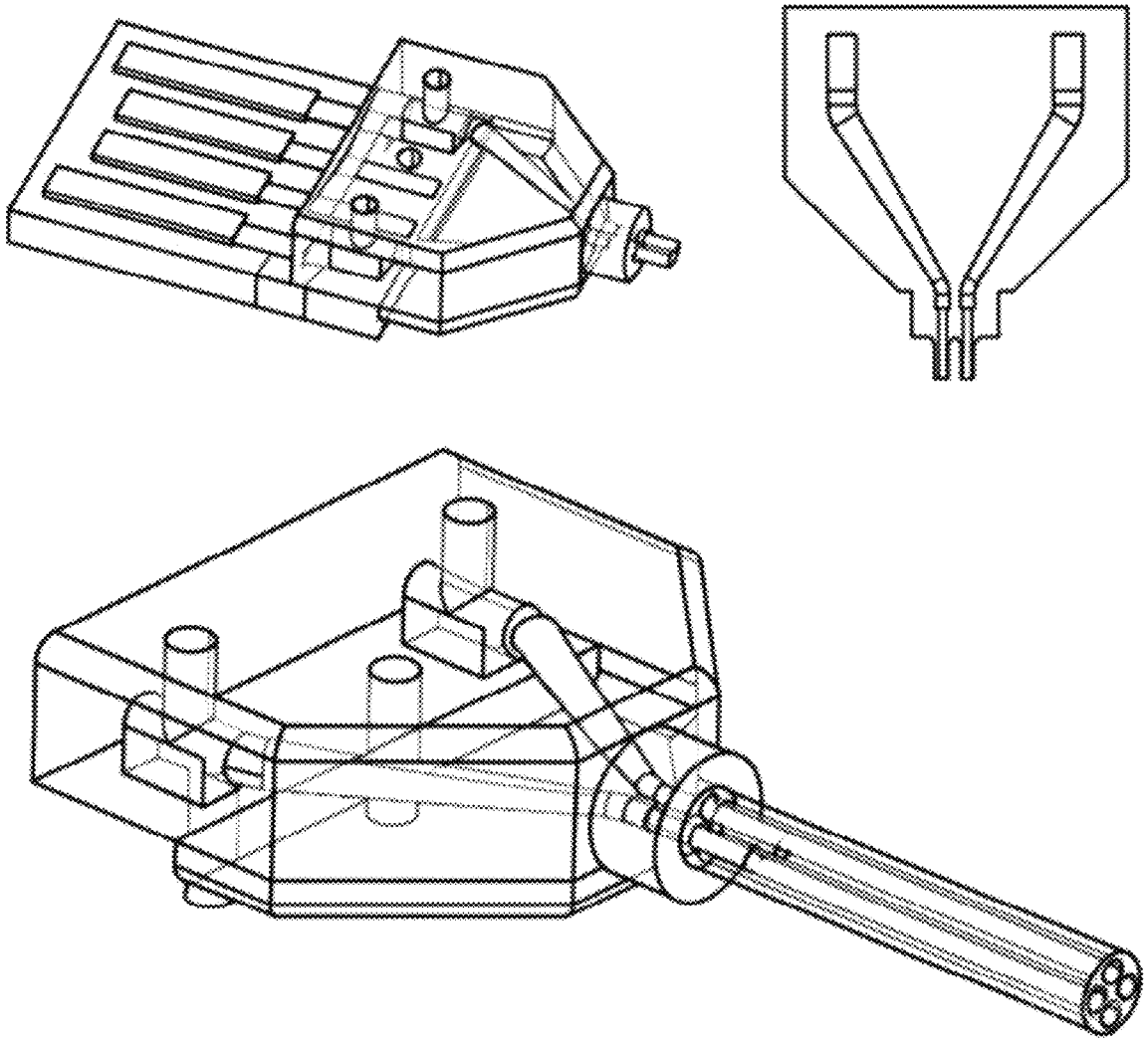
Figure 21:
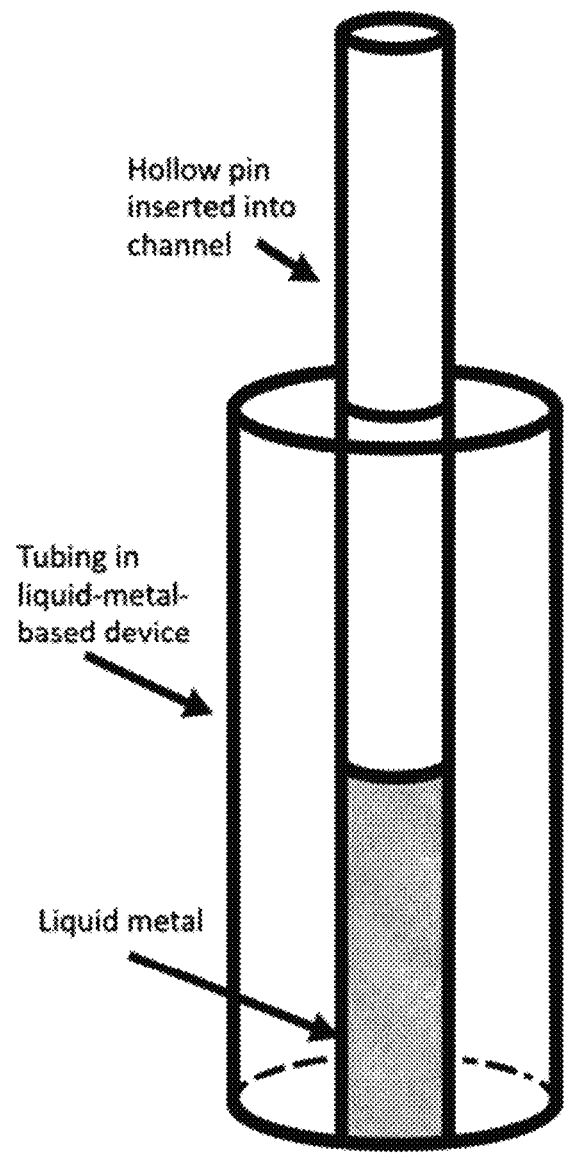
Figure 22:
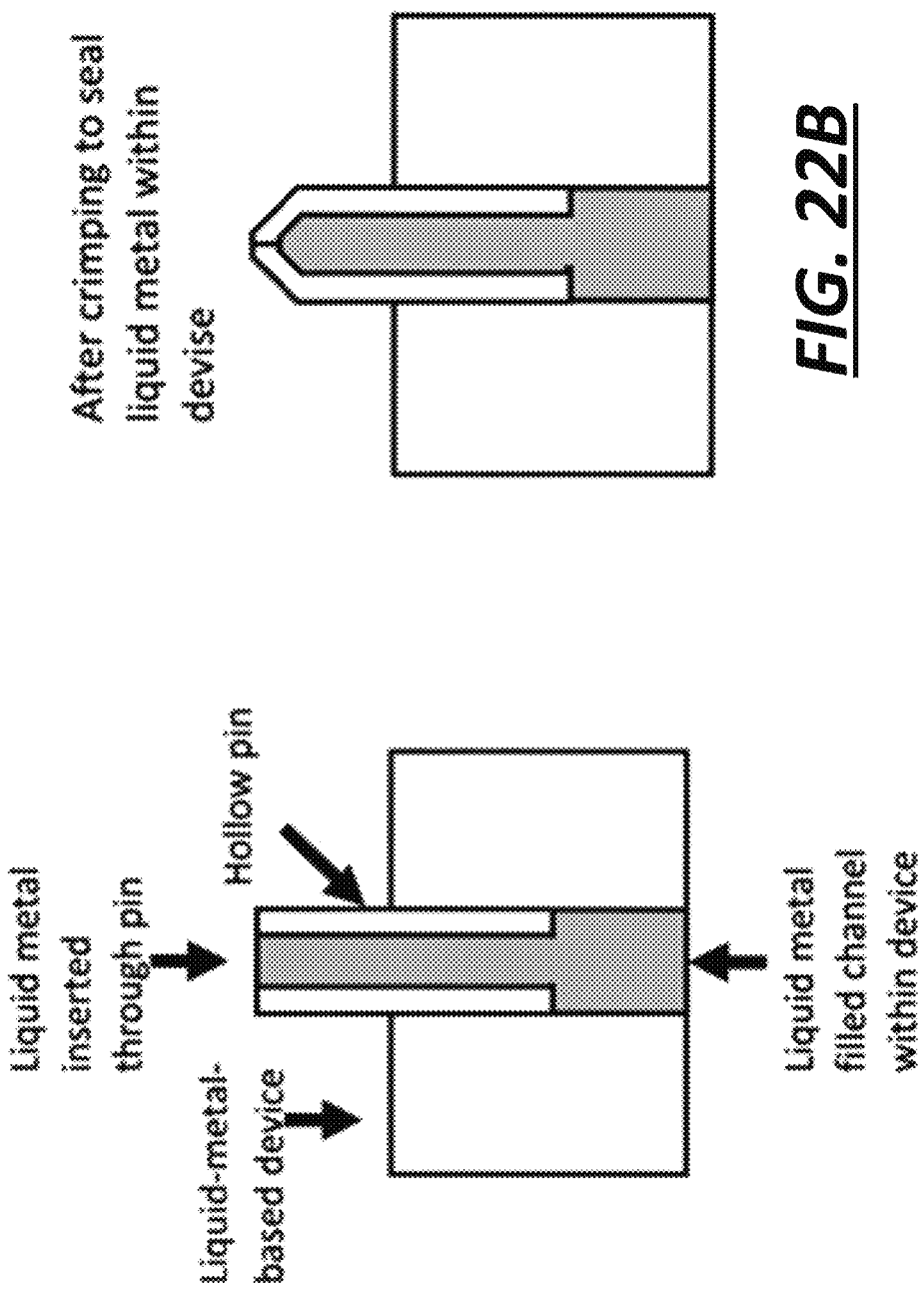
Figure 23:
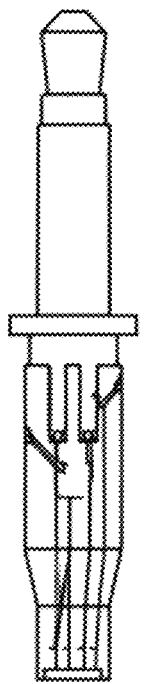
Figure 25:
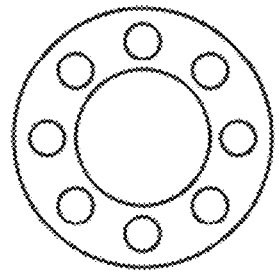
Figure 24:
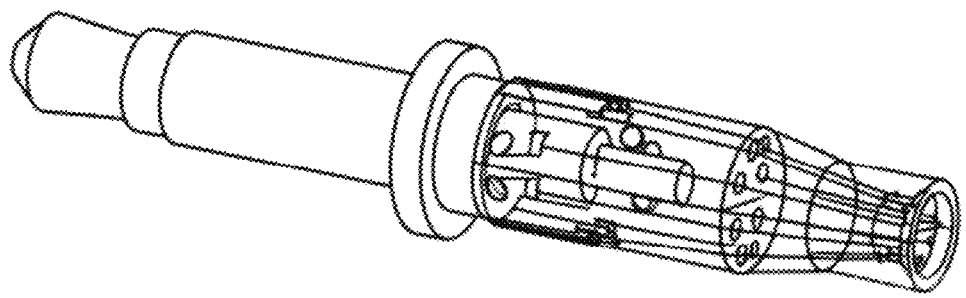

In some implementations, such as illustrated in FIGS. 16-18, hollow metal pins may be used to interface liquid metal wires and electrical connectors. Pins here refer to any hollow tubing, of any geometry (i.e. rectangular, circular, etc. depending on the application), either made of a conductive material or with conductive material on the surface (i.e. stainless steel or copper pins, or tubes made of a non-conductive material such as silicone or a thermoplastic with gold, platinum, etc. plated, sputtered, or otherwise bonded to the surface). The liquid metal can fill one or more lumens within a stretchable wire. The metal pins may be inserted into these terminals or lumens prior to filling, and serve as a check valve, allowing for liquid metal to remain within the wire within being forced out, up to a pre-defined pressure that is decided by the inner diameter of the pin. Further, such pins may serve as an electrical contact, allowing current to pass from one pin, through the liquid metal and through the pin on the other side, interfacing with one or more electrical connectors. Such pins can further ensures electrical contact. By filling the wires with liquid metal through the hollow pins, the pins and wire are filled with liquid metal. This allows for contact of the pin with the liquid metal for the entire length of the pin, and maintains sufficient volume within the wire. Additionally, pins can be used to control filling processes. By attaching pins prior to filling and filling through the pins, not only is electrical contact ensured within the inner walls of the pins, but it allows for a clean filling process by not requiring the filling apparatus to be removed and a solid conductor to be inserted for electrical connection. Additionally, this allows some control over the pressure inside the pins and liquid-metal-based devices. During filling, when a desired pressure or volume is reached, the pins may be crimped or capped, sealing the ends to avoid leaking and maintaining the desired pressure or volume within the device(s). In another example, illustrated in FIGS. 19-21, an audio/video connector can be implemented using the concepts introduced above, to enable liquid metal to be utilized to implement an audio/video wire, among other examples.

In one example implementation, tests of long-term electrical contact within a system as described above were conducted. Hollow gold or stainless steel pins are inserted into either side of thermoplastic elastomer tubing in three samples. Eutectic Gallium Indium (eGaIn) was inserted into the device by encompassing the pin on one side with a syringe tip, and pushing the eGaIn through the pin and the device with a syringe until it was observed exiting the pin on the opposite side. At this point, both pins were crimped and the syringe was removed. Over time, this has showed resistance to leaking and consistent electrical conductivity across the two pins.

Turning to FIGS. 26A-26B, simplified block diagrams 2600*a-b* are shown illustrating views of an example implementation of a connector element, which may be formed from a flexible silicone or other material. For instance, a first view 2600*a* of a connector element 2605 is shown where one or more fluidic wires (e.g., 105*a*, 105*b*) may enter at one side of the connector element 2605 and use the connector element 2605 to connect to one or more other fluidic wires (e.g., 105*c*, 105*d*). In addition to connecting two lengths of fluidic wire and thereby extending the length of a connection implemented using fluidic wire technology, a connector element may also expose conductive elements (e.g., 2610, 2615) to facilitate connections to other devices or connections (e.g., using solid metal leads). For instance, conductive elements may implement electrical connectors 2610, 2615 implemented, for instance, as sold metal plugs (e.g., formed from a palladium-, silver-, gold-, copper-, steel-based material, etc.), which are inserted into the connector element and interface with liquid metal filled within chambers of the connector element 2605.

FIG. 26B shows a cross-sectional view 2600*b* of an example connector element 2605. Electrical connector plugs 2610, 2615 may include exposed surfaces enabling external components to be connected to the connector element 2605 and other device via fluidic wires coupled to the connector element 2605. The electrical connector plug may extend into cavities 2620, 2625 of the connector element 2605 to conductively join the electrical connector to the fluidic wires by bringing the electrical connector plug into contact with liquid metal reservoirs formed by the cavities 2620, 2625. The liquid metal in cavities 2620, 2625 flows into the fluidic wires coupled to the connector element 2605 to enable an electrical connection between the electrical connectors 2610, 2615 with any other element coupled to the fluidic wires, among other examples.

In some implementations, the connector element 2605 may be assembled by combining two or more connector element sections. Accordingly, in some implementations, additional cavities may be provided for adhesive material (e.g., silicone-based adhesive) to permanently join the connect element sections (and potentially also the fluidic wire casings) and form the connector element 2605 assembly. In addition to, or as an alternative to the example implementations discussed herein, connections and interfaces adopted in a system including liquid metal wires, including liquid-metal-wire-based touch sensors may, in some implementations, be according to principles and implementations shown and discussed in PCT Application Ser. No. PCT/US2017/043407, entitled "Fluidic Wire Connectors," which is incorporated by reference herein in its entirety.

Figure 27:
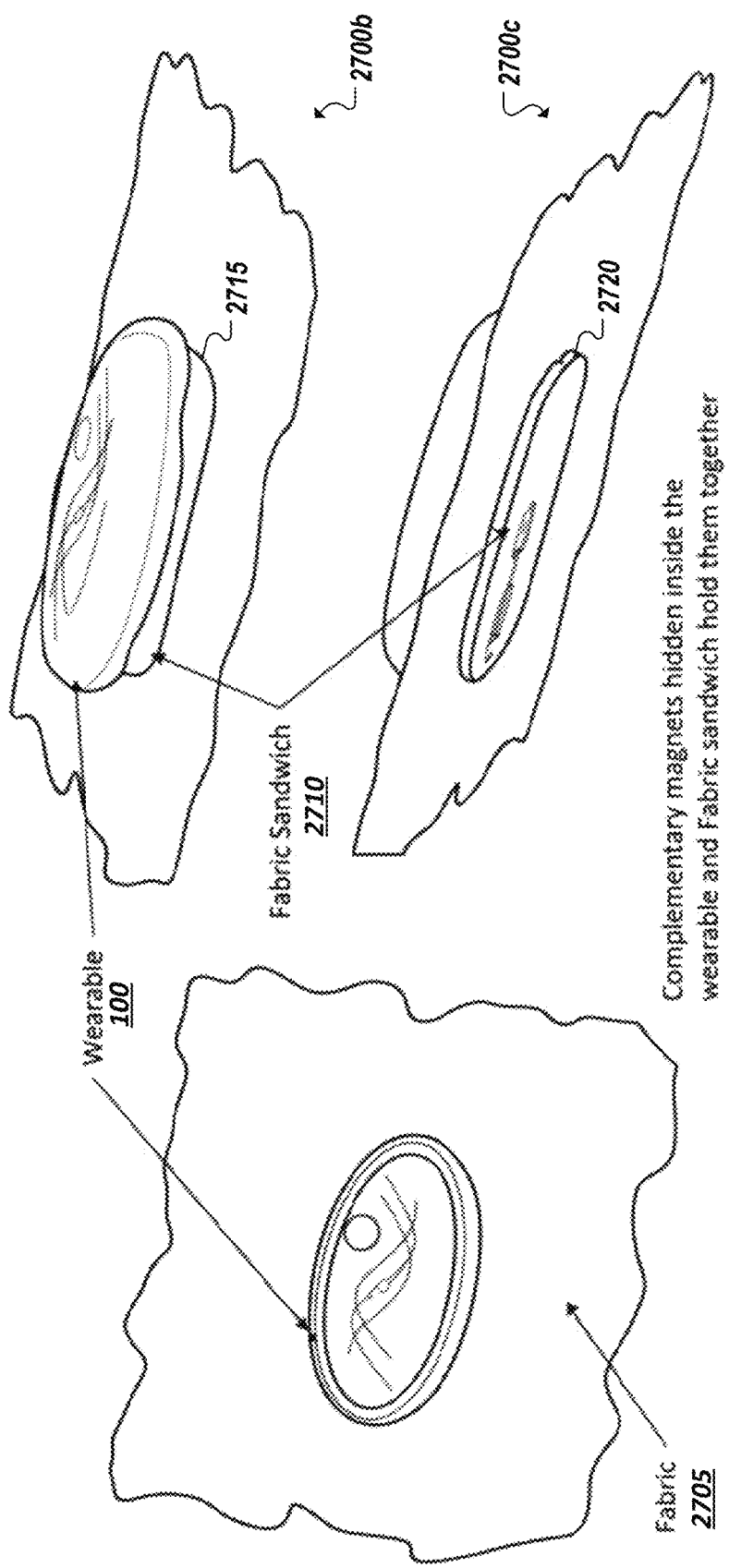
FIG. 27 are diagrams showing a fabric sandwich element to connect a sensor block device to material of a wearable device.

In some implementations, for wearable devices, it may be desirable to limit the amount of electronic circuitry that is permanently affixed to the wearable (e.g., a garment), for instance, to more easily enable electronic circuitry (and associated batteries) to be recharged, to allow the garment to be washed, to allow electronic circuitry to be replaced (e.g., for repair or to upgrade the logic of sensors devices used in the wearable device), among other example reasons. Turning to FIG. 27, diagrams 2700a-c are shown illustrating views of an example sensor block 100 implemented as a modular or removable sensor block device, which may be removably attached to the fabric 2705 (or other material) of a garment through a fabric sandwich component 2710. The garment may include one or more fluidic wires which are attached on, embedded in, or interwoven within the fabric. The fluidic wires may terminate at a connector (e.g., using one of the connector orientations shown and described herein) located at the fabric sandwich element 2710. The sensor block device 100, when connected to the fabric sandwich element 2710 may utilize the fabric sandwich element to establish an electrical connection to the fluidic wires utilizing corresponding contacts provided on the sensor block device and the fabric sandwich element. The sensor block device may utilize a mechanical or magnetic connection to physically (and removably) couple with the fabric sandwich element. For instance, complimentary magnets may be provided in the sensor block device and the fabric sandwich element device to facilitate a secure, yet removable, connection between the two elements 100, 2710.

While the sensor block device 100 may be readily removable from the fabric sandwich element 2710, the fabric sandwich element 2710 may be permanently attached to (or otherwise less readily removable from) the fabric 2705 of the garment (e.g., a garment such as discussed in the examples above). As shown in views 2700b, 2700c The fabric sandwich element 2710 may include an outer piece 2715 and an inner piece 2720, which are each respectively positioned on an opposing surface of the fabric 2705. The outer and inner pieces of the fabric sandwich element may be fixedly attached through the fabric 2705 to "sandwich" a section of the fabric 2705 between the two pieces 2715, 2720, the section of fabric corresponding to an end of one or more fluidic wires, which are to connect to the fabric sandwich element 2710.

Figure 28:
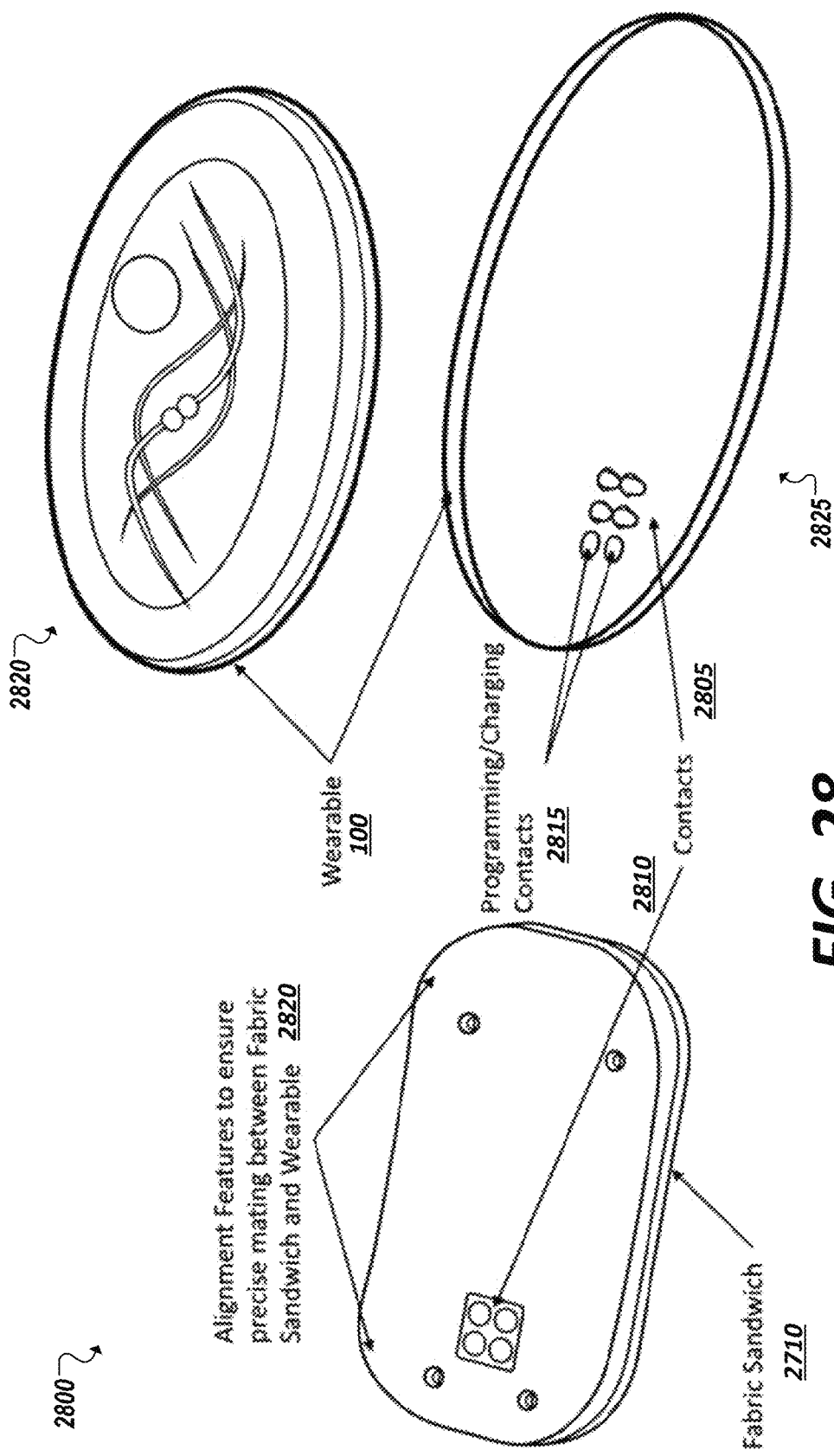
FIG. 28 are diagrams showing elements of an example fabric sandwich element and corresponding sensor block device.

Turning to FIG. 28, a diagram 2800 is shown illustrating additional example features of a sensor block device 100 configured to attached to a wearable garment device via a fabric sandwich element 2710. The outer piece of the fabric sandwich device 2710 may form a cradle for accepting the sensor block device 100 and include alignment features 2820 to assist guiding the sensor block device 100 into the cradle to facilitate precise mating of the sensor block device 100 within this cradle. For instance, the sensor block device 100 may include a set of electrical contacts 2805 on an underside 2825 of the sensor block device, which are to align (when seated within the cradle of the fabric sandwich element 2710) with complimentary electrical contacts 2810 on the outer piece of the fabric sandwich element 2710. In some implementations, the sensor block device 100 may include additional contacts 2815 (e.g., for use in programming and/or charging the sensor block device 100 (e.g., when not connected to the garment via the fabric sandwich element). An upper side 2820 of the sensor block device 100 may be exposed when the sensor block device 100 is coupled to the fabric sandwich element and may include a user interface, such as a display, button(s), indicator lights, and other features (e.g., at 2830).

Figure 29:
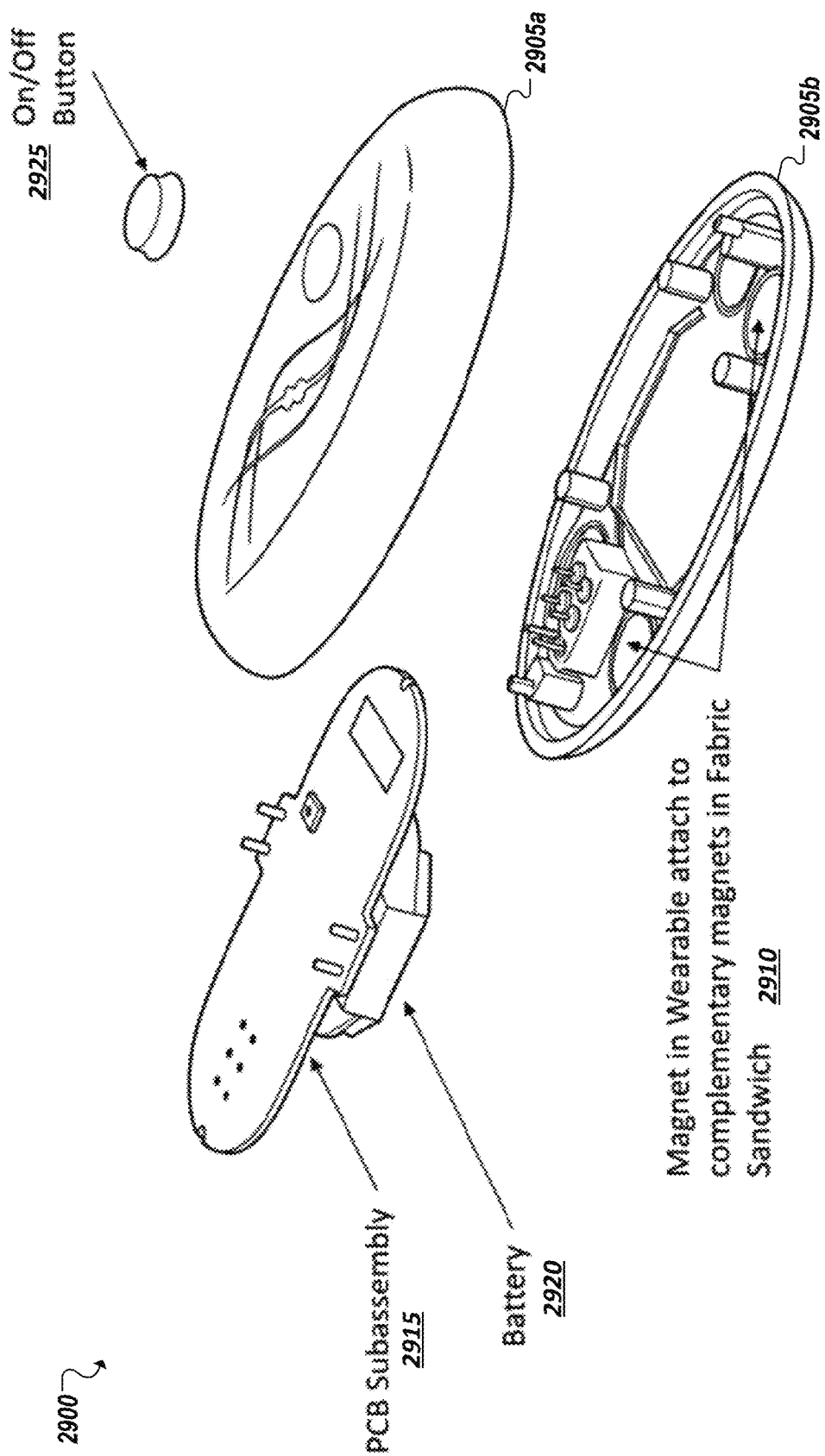
FIG. 29 is an exploded view of an example sensor block device.

Turning to FIG. 29, an exploded view 2900 of an example sensor block device is shown. Among the components, which may be contained with the external housing of the sensor block device (e.g., constructed from housing shell pieces 2905a, 2905b), are a circuit board 2915 (e.g., a printed circuit board (PCB)) upon which one or more hardware circuitry devices (e.g., integrated circuits, system-on-chips, etc.) may be mounted and interconnected, including components to facilitate wireless communications between the sensor block device and other computing systems, components to implement internal sensor logic of the sensor block device (e.g., sensor data generation, sensor data interpretation and processing logic, etc.) among other example components. Contacts 2805, 2815 may connect into the circuit board 2915 and the subassembly may include a housing for a batter 2910 to power the circuit board 2915 and its components. Additional components may include magnets 2910 for use in coupling the sensor block device to the fabric sandwich element, a button 2925, and other components of the sensor block device.

Figure 30:
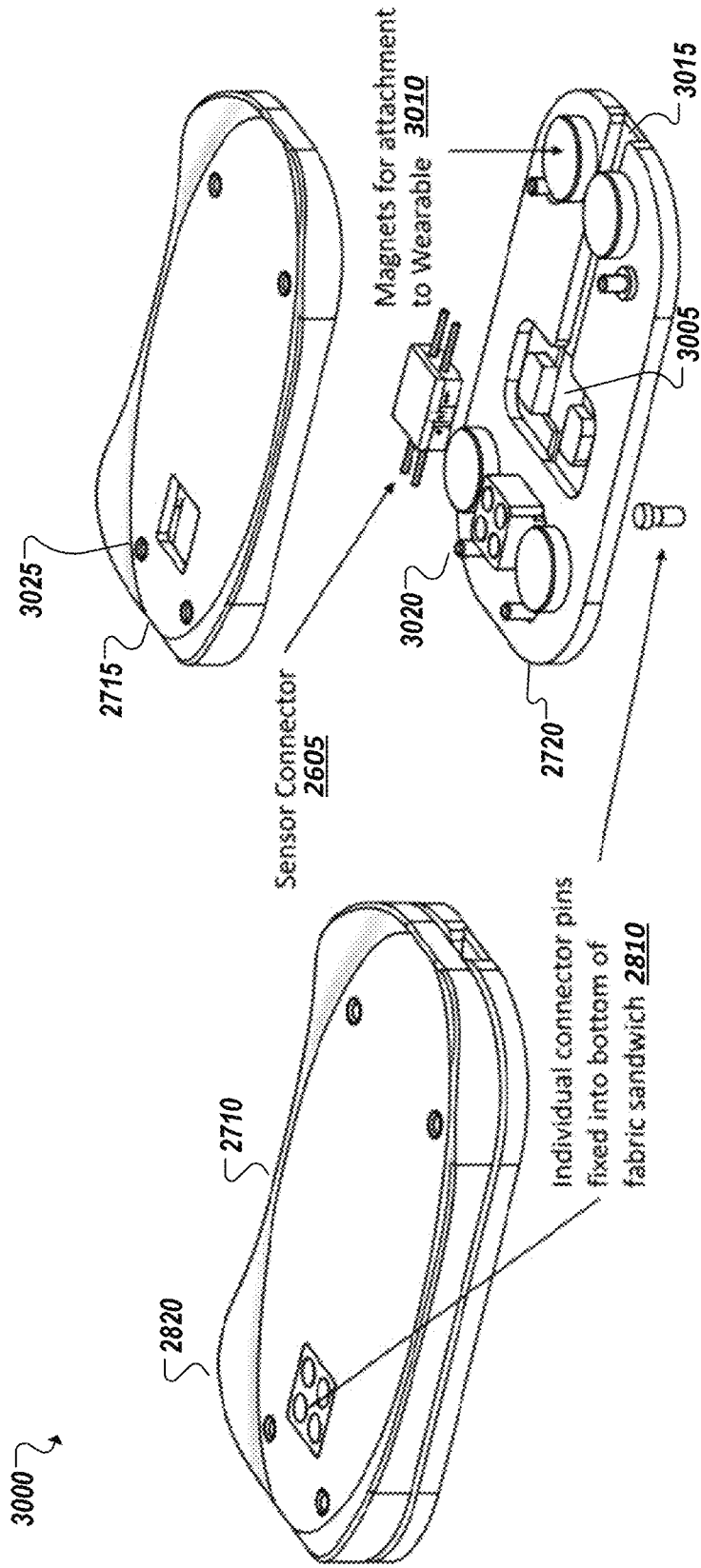
FIG. 30 is an exploded view of an example fabric sandwich element.

Turning to FIG. 30, an exploded view 3000 of an example fabric sandwich element 2710 is shown. In this example, an opening 3005 may be provided in the inner piece 2720 of the fabric sandwich element to facilitate a connector element (e.g., 2605) to couple one or more fluidic wires to the contacts 2810 of the fabric sandwich element 2710. A channel or groove 3015 may be provided, in some implementations, to accept and lead one or more fluidic wires to the connection at the contacts 2810. In other implementations, the connection of fluidic wires to the fabric sandwich element may be facilitated through the outer piece 2715 of the fabric sandwich element. To facilitate a connection with sensor block devices, complimentary magnets (e.g., 3010) may be provided on the inner and/or outer piece of the fabric sandwich element to attract corresponding magnets of the sensor block device. The connection between the inner and outer pieces 2715, 2720 may be facilitated utilizing a variety of attachment mechanisms. For instance, in one example, pin couplings (e.g., 3020) may be provided on the inner piece 2720 and may be configured to mate with openings (e.g., 3025) on the outer piece 2715. The pin couplings (e.g., 3020) may be pushed through a fabric layer (to be sandwiched between the inner and outer piece) into the corresponding openings (e.g., 3025) of the outer piece. A screw, adhesive, or other mechanism may be utilized to bind the pin coupling to the opening and thereby fasten the inner piece 2720 to the outer piece 2715 of the fabric sandwich element and attach the fabric sandwich element to the material (e.g., fabric) of a garment.

Figure 31:
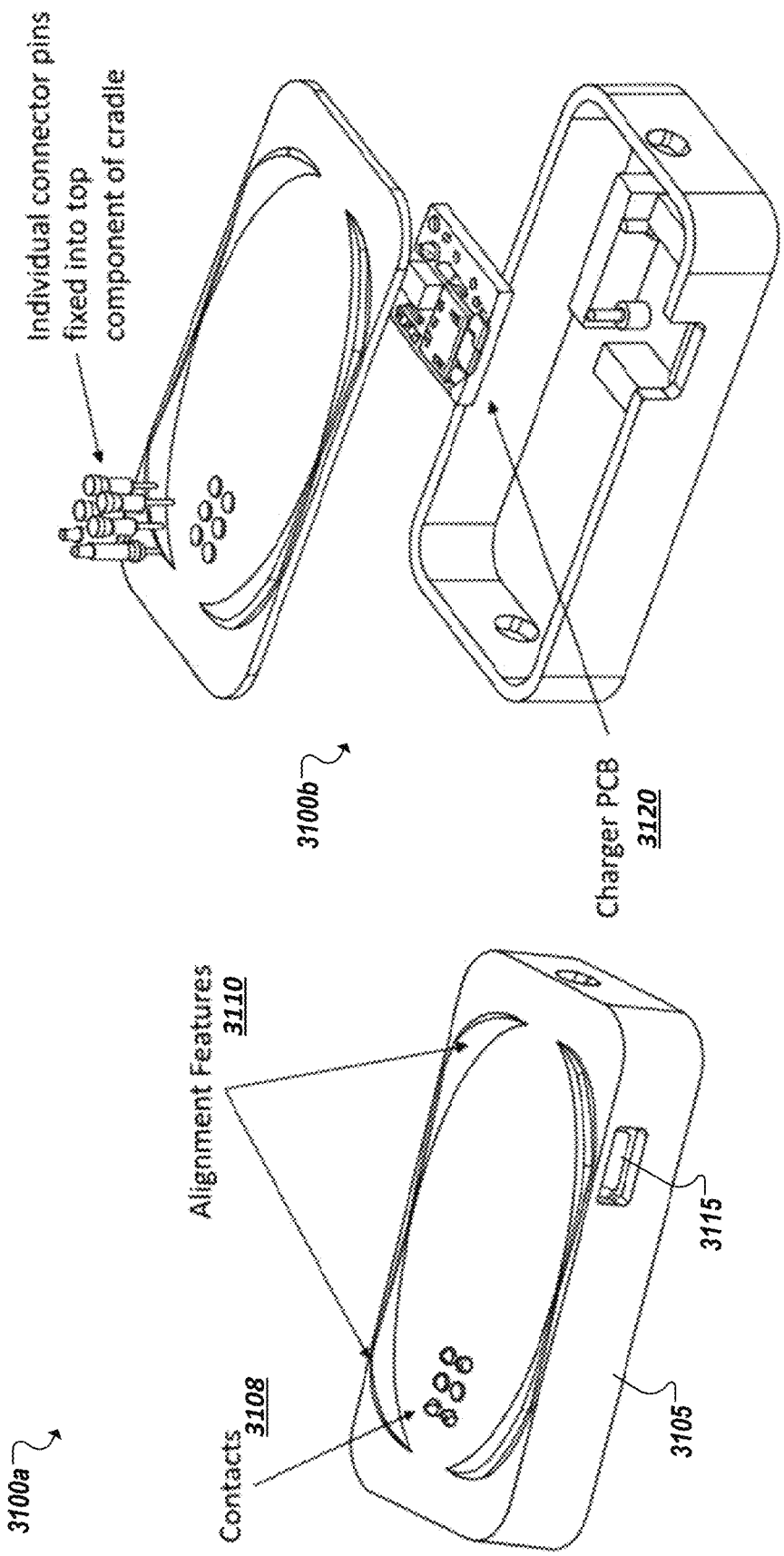
FIG. 31 is a diagram illustrating views of an example docking device for use with an example sensor block device.

Turning to FIG. 31, a diagram 3100 is shown of an example docking device 3105 for use with an example sensor block device (e.g., as shown in the examples of FIGS. 27-29). A docking device may be utilized, for instance, to facilitate an interface with charging and/or programming contacts (e.g., contacts 2815 shown in FIG. 28) of a sensor block device. As such, the docking device 3105 may be used to charge the sensor block device's battery and/or may be used to connect the sensor block device to an external computing device (through the docking device) to install or update sensor logic on the sensor block device, perform debugging, or other tasks. In some implementations, the docking device 3105 may include contacts 3108 to couple to corresponding contacts of a sensor block device that is coupled to the docking device. Hardware 3120 implementing the logic and functionality (e.g., charging functionality) of the docking device may be housed within the docking device and coupled to contact 3108. In some implementations, a port 3115 (e.g., a Universal Serial Bus (USB)) may be provided on the docking device, for instance, to provide power to the docking device, to facilitate a connection between the docking device and a supporting computing device, among other example uses and features. In this example, a removable sensor block device may be conveniently removed from a fabric sandwich element on a garment and placed on the docking device to allow the sensor block device battery to be recharged, before reattaching the sensor block device to the garment (at the fabric sandwich element) following recharging of the sensor block device, among other example uses and implementations.

It should be appreciated that fabric sandwich devices may facilitate the connection of one or multiple fluidic wires on a garment with one or potentially multiple removable sensor block devices coupled to the fabric sandwich device. Indeed, modular wearable sensor designs may be adopted, with different sensor block devices (e.g., with different logic and capabilities) capable of being interchangeably connected to the garment and its fluidic wires to sense a variety of different biometric attributes of a wearer of the garment, among other examples. Further, multiple fabric sandwich elements may be located at different places within the same garment to allow multiple removable sensor block devices to be coupled at corresponding positions on the garments, among other example implementations.

Computing systems used in association with fluidic-wire-based sensors may be implemented as various combinations of components. These components may be implemented as ICs, portions thereof, discrete electronic devices, or other modules, logic, hardware, software, firmware, or a combination thereof adapted in a computer system, or as components otherwise incorporated within a chassis of the computer system. However, it is to be understood that some of the components shown may be omitted, additional components may be present, and different arrangement of the components shown may occur in other implementations. As a result, the solutions described above may be implemented in any portion of one or more of the interconnects illustrated or described herein.

A processor, in one embodiment, includes a microprocessor, multi-core processor, multithreaded processor, an ultra-low voltage processor, an embedded processor, or other known processing element. In the illustrated implementation, processor acts as a main processing unit and central hub for communication with many of the various components of the system. As one example, processor is implemented as a system on a chip (SoC).

Logic and modules as used herein may refer to any combination of hardware, software, and/or firmware. As an example, a logic module may include hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Data and data values, as used herein, include any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 2510 and a hexadecimal letter A. Therefore, a value includes any representation of information capable of being held in a computer system.

The embodiments of logic as set forth above may be implemented via instructions or code stored on a machine-accessible, machine readable, computer accessible, or computer readable medium which are executable by a processing element. A non-transitory machine-accessible/readable medium includes any mechanism that provides (e.g., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

The following examples pertain to embodiments in accordance with this Specification. Example 1 is a touch sensor including: one or more liquid metal wires and detection logic. The detection logic includes hardware circuitry to: detect a change in an electrical attribute of the one or more liquid metal wires based on a depression of the one or more liquid metal wires; and indicate a touch event corresponding to the depression of the one or more liquid metal wires based on the change in the electrical attribute.

Example 2 may include the subject matter of example 1, where the liquid metal wire includes an insulating elastomeric covering to enclose a liquid metal.

Example 3 may include the subject matter of example 2, where the liquid metal includes a gallium-based metal.

Example 4 may include the subject matter of example 3, where the liquid metal includes eutectic gallium indium (EGaIn).

Example 5 may include the subject matter of any one of examples 1-4, where the one or more liquid metal wires include a plurality of liquid metal wires and the detection logic is further to detect a depression of any individual one of the plurality of liquid metal wires.

Example 6 may include the subject matter of example 5, where the detection logic is further to determine a location of the touch event based on detection of a depression of two or more of the liquid metal wires.

Example 7 may include the subject matter of example 6, where the depression of the two or more liquid metal wires is concurrent.

Example 8 may include the subject matter of example 6, where the depression of the two or more liquid metal wires is in series.

Example 9 may include the subject matter of any one of examples 1-8, where the touch event is further based on an intensity of the detected change.

Example 10 may include the subject matter of any one of examples 1-9, where the touch event is further based on a pattern of depressions of the one or more liquid metal wires.

Example 11 may include the subject matter of any one of examples 1-10, where the touch event is further based on a duration of the depression.

Example 12 may include the subject matter of any one of examples 1-11, where the electrical attribute includes impedance of the one or more liquid metal wires.

Example 13 may include the subject matter of any one of examples 1-12, where the electrical attribute includes inductance of the one or more liquid metal wires.

Example 14 may include the subject matter of any one of examples 1-12, where the electrical attribute includes capacitance of the one or more liquid metal wires.

Example 15 may include the subject matter of any one of examples 13-14, where the one or more liquid metal wires includes a single liquid metal wire.

Example 16 may include the subject matter of any one of examples 1-12, where the hardware circuit includes a voltage divider including the one or more liquid metal wires and the electrical attribute includes a voltage measured at the voltage divider.

Example 17 may include the subject matter of any one of examples 1-16, where the depression is caused by the touch event.

Example 18 is an article including a touch interface including the touch sensor of any one of examples 1-17.

Example 19 may include the subject matter of example 18, where the article includes a garment.

Example 20 may include the subject matter of example 19, where the garment includes an elastomeric athletic garment.

Example 21 may include the subject matter of example 18, where the article includes upholstery.

Example 22 may include the subject matter of example 18, where the article includes wallpaper.

Example 23 may include the subject matter of example 18, where the article includes athletic equipment.

Example 24 may include the subject matter of example 18, where the article includes a medical device.

Example 25 may include the subject matter of example 18, where the article includes a headphone cord.

Example 26 is a flexible sensor including: a single liquid metal wire; a measurement circuit coupled to the liquid metal wire to measure impedance across the liquid metal wire; and detection logic to detect from the measurement circuit a change in the impedance corresponding to a depression of the liquid metal wire by a force.

Example 27 may include the subject matter of example 26, where the liquid metal wire includes a stretchable covering to contain a liquid metal.

Example 28 may include the subject matter of example 27, where the depression compresses a portion of the cross-sectional geometry of the covering corresponding to location of the force.

Example 29 may include the subject matter of example 28, wherein the cross-sectional geometry is one of a rectangular geometry, a triangular geometry, and a hexagonal geometry.

Example 30 may include the subject matter of any one of examples 26-28, further including a resistor connected in series with the liquid metal wire to form a voltage divider, where the measurement circuit is to measure resistance of the liquid metal wire using the voltage divider.

Example 31 may include the subject matter of any one of example 26-30, where the liquid metal wire is attached to a fabric substrate.

Example 32 may include the subject matter of example 31, where the liquid metal wire is interwoven into the fabric substrate.

Example 33 may include the subject matter of any one of example 31-32, where the fabric substrate includes an elastomeric substrate.

Example 34 may include the subject matter of any one of example 31-33, where one or both of the measurement circuit and detection logic are attached to the fabric substrate.

Example 35 may include the subject matter of any one of examples 26-34, further including a battery to apply a voltage to the liquid metal wire.

Example 36 may include the subject matter of any one of examples 26-35, where the liquid metal includes a gallium-based metal.

Example 37 may include the subject matter of example 36, where the liquid metal includes eutectic gallium indium (EGaIn).

Example 38 is a system including: one or more liquid metal cavities and detection logic. The detection logic can include hardware circuitry to: detect a change in an electrical attribute of the one or more liquid metal cavities based on a depression of the one or more liquid metal cavities; and indicate a touch event corresponding to the depression of the one or more liquid metal cavities based on the change in the electrical attribute.

Example 39 may include the subject matter of example 38, further including a microprocessor coupled to the detection logic.

Example 40 may include the subject matter of example 38, where further including a component to: receive a signal generated based on the touch event indicated by the detection logic; and perform an action based on the signal.

Example 41 may include the subject matter of example 40, where component includes a user interface to present information to a user.

Example 42 may include the subject matter of example 41, where the user interface includes one of an indicator light, a speaker, or a display.

Example 43 may include the subject matter of example 40, where the component is to generate data describing the touch event.

Example 44 may include the subject matter of example 43, further including computer memory to store the generated data.

Example 45 may include the subject matter of any one of examples 38-44, where one or more liquid metal cavities are to emit a wireless signal and electrical attribute includes a characteristic of the wireless signal emitted from the one or more liquid metal cavities.

Example 46 may include the subject matter of any one of examples 48-45, where the one or more liquid metal cavities include at least one liquid metal wire.

Example 47 may include the subject matter of any one of examples 48-45, where the one or more liquid metal cavities include at least one liquid metal blister.

Example 48 is a touch sensor including one or more liquid metal cavities and detection logic. The detection logic includes hardware circuitry to: detect a change in an electrical attribute of the one or more liquid metal cavities based on a depression of the one or more liquid metal cavities; and indicate a touch event corresponding to the depression of the one or more liquid metal cavities based on the change in the electrical attribute.

Example 49 may include the subject matter of example 48, where the liquid metal cavities includes an insulating elastomeric covering to enclose a liquid metal.

Example 50 may include the subject matter of example 49, where the liquid metal includes a gallium-based metal.

Example 51 may include the subject matter of any one of examples 48-50, where the one or more liquid metal cavities include at least one liquid metal wire.

Example 52 may include the subject matter of any one of examples 48-51, where the one or more liquid metal cavities include at least one liquid metal blister.

Example 53 may include the subject matter of any one of examples, where the electrical attribute includes impedance of a circuitry including the one or more liquid metal cavities.

Example 54 is an apparatus including: a wearable device including: a liquid metal wire including an elongated elastomeric tube with a tubular external surface and an internal cavity with a uniform cross-sectional geometry, where the internal cavity is at least partially filled with liquid metal; and detection logic including hardware circuitry to: detect a change in an electrical attribute of the liquid metal wire based on a temporary change in the cross-sectional geometry; and generate sensor data to identify an event associated with a wearer of the wearable device based on the temporary change in the cross-sectional geometry.

Example 55 includes the subject matter of example 54, where the event includes a movement by the wearer of the wearable device and the temporary change in the cross-sectional geometry is based on the movement.

Example 56 includes the subject matter of example 55, where the movement includes respiration of the wearer, and the liquid metal wire is located to correspond to at least a portion of a torso of the wearer.

Example 57 includes the subject matter of example 55, where the movement includes at least one of contraction or relaxation of a muscle of the wearer, and the liquid metal wire is located to correspond to a circumference of the muscle.

Example 58 includes the subject matter of example 55, where the movement includes flexion of a joint of the wearer, and the liquid metal wire is located to cross the joint substantially perpendicular to an axis of rotation of the joint.

Example 59 includes the subject matter of any one of examples 55-58, where the wearable device includes a plurality of liquid metal wires, the movement includes a compound movement of a plurality of different body parts of the user, and the plurality of liquid metal wires are located on the wearable device to correspond to the plurality of different body parts.

Example 60 includes the subject matter of any one of examples 54-59, where the liquid metal wire includes a first end and a second end, the first and second ends of the liquid metal wire are connected to the detection logic to form a loop.

Example 61 includes the subject matter of any one of examples 54-60, where the liquid metal wire connects to the detection logic via a connector, the connector includes a reservoir including a solid conductor element, an end of the liquid metal wire is connected to the reservoir to allow the liquid metal to flow between the internal cavity and the reservoir.

Example 62 includes the subject matter of any one of examples 54-61, where the change in the cross-sectional geometry is caused by a temporary elongation of the tube.

Example 63 includes the subject matter of any one of examples 54-62, where the liquid metal includes a gallium-based metal.

Example 64 includes the subject matter of example 63, where the liquid metal includes eutectic gallium indium (EGaIn).

Example 65 includes the subject matter of any one of examples 54-64, where the electrical attribute includes impedance.

Example 66 is a garment including: a liquid metal wire fixedly attached to the garment, where the liquid metal wire includes an elongated elastomeric tube with an internal cavity forming an internal volume, and at least a portion of the internal volume of the elastomeric tube is partially filled with liquid metal; and a connector fixedly attached to the garment, where the connector includes: a liquid metal wire interface including: a solid conductive element; a reservoir with an internal volume, where at least a portion of the solid conductive element is positioned within the internal volume, an end of the liquid metal wire is connected to an opening of the reservoir to form a contiguous volume including the internal volume of the internal cavity and the internal volume of the reservoir, where the liquid metal is to contact the portion of the solid conductive element; and a receptacle fixedly attached to the garment to couple to the liquid metal wire interface, where the receptacle is to removably connect to a sensor device, and an electrical connection is established between the sensor device and the liquid metal wire when the sensor device is connected to the receptacle.

Example 67 includes the subject matter of example 66, where the connector includes a first piece and a second piece, and the connector is fixedly attached to the garment to press material of the garment between the first piece and the second piece.

Example 68 includes the subject matter of any one of examples 66-67, where the receptacle includes one or more magnets to connect to complimentary magnets of the sensor device.

Example 69 includes the subject matter of any one of examples 66-68, where the garment includes one of a shirt, leggings, a jumpsuit, a stocking, or a glove.

Example 70 is a system including: a wearable sensor device including: a liquid metal wire including an elongated elastomeric tube with a tubular external surface and an internal cavity with a uniform cross-sectional geometry, where the internal cavity is at least partially filled with liquid metal; and sensor circuitry to: detect a change in an electrical attribute of the liquid metal wire based on a temporary change in the cross-sectional geometry; and generate sensor data to identify the change in the electrical attribute; and a data processing device including: a processor; and biometric detector executable by the data processor to: receive the sensor data; and determine from the sensor data that the change in the electrical attribute corresponds to a biometric of a wearer of the wearable sensor device.

Example 71 includes the subject matter of example 70, where the biometric includes one of movement of a joint, chest expansion during respiration, or muscle contraction.

Example 72 includes the subject matter of any one of examples 70-71, further including a user interface to present an output associated with the biometric.

Example 73 includes the subject matter of any one of examples 70-72, where the biometric detector is to provide the biometric as a user input to an application to control the application.

Example 74 includes the subject matter of any one of examples 70-73, where the wearable sensor device includes the apparatus of any one of examples 54-65.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

A detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. An apparatus comprising:
   a wearable device comprising:
      a liquid metal wire comprising an elongated elastomeric tube with a tubular external surface and an internal cavity with a uniform cross-sectional geometry, wherein the internal cavity is at least partially filled with liquid metal; and
      detection logic comprising hardware circuitry to:
         detect a change in an electrical attribute of the liquid metal wire based on a temporary change in the cross-sectional geometry; and
         generate sensor data to identify an event associated with a wearer of the wearable device based on the temporary change in the cross-sectional geometry.

2. The apparatus of claim 1, wherein the event comprises a movement by the wearer of the wearable device and the temporary change in the cross-sectional geometry is based on the movement.

3. The apparatus of claim 2, wherein the movement comprises respiration of the wearer, and the liquid metal wire is located to correspond to at least a portion of a torso of the wearer.

4. The apparatus of claim 2, wherein the movement comprises at least one of contraction or relaxion of a muscle of the wearer, and the liquid metal wire is located to correspond to a circumference of the muscle.

5. The apparatus of claim 2, wherein the movement comprises flexion of a joint of the wearer, and the liquid metal wire is located to cross the joint substantially perpendicular to an axis of rotation of the joint.

6. The apparatus of claim 2, wherein the wearable device comprises a plurality of liquid metal wires, the movement comprises a compound movement of a plurality of different body parts of the user, and the plurality of liquid metal wires are located on the wearable device to correspond to the plurality of different body parts.

7. The apparatus of claim 1, wherein the liquid metal wire comprises a first end and a second end, the first and second ends of the liquid metal wire are connected to the detection logic to form a loop.

8. The apparatus of claim 1, wherein the liquid metal wire connects to the detection logic via a connector, the connector comprises a reservoir comprising a solid conductor element, an end of the liquid metal wire is connected to the reservoir to allow the liquid metal to flow between the internal cavity and the reservoir.

9. The apparatus of claim 1, wherein the change in the cross-sectional geometry is caused by a temporary elongation of the tube.

10. The apparatus of claim 1, wherein the liquid metal comprises a gallium-based metal.

11. The apparatus of claim 10, wherein the liquid metal comprises eutectic gallium indium (EGaIn).

12. The apparatus of claim 1, wherein the electrical attribute comprises impedance.

13. A garment comprising:
   a liquid metal wire fixedly attached to the garment, wherein the liquid metal wire comprises an elongated elastomeric tube with an internal cavity forming an internal volume, and at least a portion of the internal volume of the elastomeric tube is partially filled with liquid metal; and
   a connector fixedly attached to the garment, wherein the connector comprises:
      a liquid metal wire interface comprising:
         a solid conductive element;
         a reservoir with an internal volume, wherein at least a portion of the solid conductive element is positioned within the internal volume, an end of the liquid metal wire is connected to an opening of the reservoir to form a contiguous volume comprising the internal volume of the internal cavity and the internal volume of the reservoir, wherein the liquid metal is to contact the portion of the solid conductive element; and
      a receptacle fixedly attached to the garment to couple to the liquid metal wire interface, wherein the receptacle is to removably connect to a sensor device, and an electrical connection is established between the sensor device and the liquid metal wire when the sensor device is connected to the receptacle.

14. The garment of claim 13, wherein the connector comprises a first piece and a second piece, and the connector is fixedly attached to the garment to press material of the garment between the first piece and the second piece.

15. The garment of claim 13, wherein the receptacle comprises one or more magnets to connect to complimentary magnets of the sensor device.

16. The garment of claim 13, wherein the garment comprises one of a shirt, leggings, a jumpsuit, a stocking, or a glove.

17. A system comprising:

a wearable sensor device comprising:

a liquid metal wire comprising an elongated elastomeric tube with a tubular external surface and an internal cavity with a uniform cross-sectional geometry, wherein the internal cavity is at least partially filled with liquid metal; and sensor circuitry to:

detect a change in an electrical attribute of the liquid metal wire based on a temporary change in the cross-sectional geometry; and generate sensor data to identify the change in the electrical attribute; and a data processing device comprising:

a processor; and biometric detector executable by the data processor to:

receive the sensor data; and determine from the sensor data that the change in the electrical attribute corresponds to a biometric of a wearer of the wearable sensor device.

18. The system of claim 17, wherein the biometric comprises one of movement of a joint, chest expansion during respiration, or muscle contraction.

19. The system of claim 17, further comprising a user interface to present an output associated with the biometric.

20. The system of claim 17, wherein the biometric detector is to provide the biometric as a user input to an application to control the application.

* * * * *